United States Patent [19]
Kawakita et al.

[11] Patent Number: 5,659,821
[45] Date of Patent: Aug. 19, 1997

[54] DRIVING APPARATUS EMPLOYING VIBRATION TYPE MOTOR WITH STANDING WAVE CONTROL OF CAMERA SHUTTER SYSTEM

[75] Inventors: Katsuya Kawakita, Tokyo; Kazuyuki Nakagawa, Kanagawa-ken, both of Japan

[73] Assignee: Canon Kabushiki Kaisha, Tokyo, Japan

[21] Appl. No.: 578,782

[22] Filed: Dec. 26, 1995

Related U.S. Application Data

[63] Continuation of Ser. No. 146,905, Nov. 1, 1993, abandoned.

[30] Foreign Application Priority Data

Nov. 5, 1992 [JP] Japan .................................. 4-296090
Dec. 24, 1992 [JP] Japan .................................. 4-344346

[51] Int. Cl.$^6$ .................................. G03B 9/08; H01L 41/08
[52] U.S. Cl. .................................. 396/248; 396/456; 396/484; 310/323; 310/328
[58] Field of Search .................................. 354/234.1, 271.1, 354/252, 457; 310/316, 317, 323, 328; 318/116, 118; 396/246, 248, 452, 456, 483, 484

[56] References Cited

U.S. PATENT DOCUMENTS

| | | | |
|---|---|---|---|
| 4,491,401 | 1/1985 | Inaba et al. | 354/271.1 |
| 4,560,263 | 12/1985 | Katsuma et al. | 310/317 X |
| 4,671,637 | 6/1987 | Toyoda | 354/234.1 |
| 4,935,659 | 6/1990 | Naka et al. | 354/234.1 X |
| 4,989,030 | 1/1991 | Naka et al. | 354/271.1 X |

FOREIGN PATENT DOCUMENTS

2-29724  1/1990  Japan .

*Primary Examiner*—Safet Metjahic
*Assistant Examiner*—J. K. Han
*Attorney, Agent, or Firm*—Robin, Blecker, Daley & Driscoll

[57] ABSTRACT

The present invention relates to a driving apparatus arranged to perform driving control of a travelling member, such as a shutter member, by using a vibration wave motor. According to the present invention, the travelling member is arranged to be driven by the spring force of a spring member. The travelling member is held in a stopped state against the spring force by the stopping torque of the vibration wave motor, and by causing the vibration wave motor to generate a standing wave, the stopping torque is cancelled so that the travelling member starts travelling by the spring force.

16 Claims, 28 Drawing Sheets

DRIVING APPARATUS EMPLOYING VIBRATION TYPE MOTOR WITH STANDING WAVE CONTROL OF CAMERA SHUTTER SYSTEM

This is a continuation application under 37 CFR 1.62 of prior application Ser. No. 08/146,905 filed on Nov. 1, 1993, now abandoned.

BACKGROUND OF THE INVENTION

1. Field of the Invention

The present invention relates to an object driving apparatus having a spring and an ultrasonic motor and, more particularly, to an object driving arrangement suitable for use as a shutter system for an optical apparatus such as a camera.

2. Description of the Related Art

Various types of shutter systems for optical apparatuses such as cameras have heretofore been known. One conventional example of the shutter systems is arranged to charge a shutter driving spring via a gear, a cam or a lever by means of a known electromagnetic motor before the start of a running of a shutter curtain and then holds the spring in its charged state by means of a retaining mechanism for suppressing the action of the driving spring. In this example, if the running of the shutter curtain is to be started, the retention of the spring by the retaining mechanism is cancelled by a electromagnet, a cam or the like, so that the shutter curtain is driven by the driving force generated by the spring.

The aforesaid shutter system has an arrangement such as that shown in FIG. 16. The output speed of a single charging driving source which is not shown (for example, an electromagnetic motor) is reduced to drive a first charging lever 70, thereby approximately simultaneously charging leading and trailing curtains via a second charging lever 71.

However, the above-described shutter system has the following problems.

(i) Since a known electromagnetic motor is employed as a driving source for charging a shutter curtain driving spring, a gear mechanism of large speed reduction ratio and a power transmission mechanism, such as a cam or a lever, must be disposed between the motor and the spring in order to obtain a sufficient torque to elastically deform the spring. Of necessity, the complexity and size of the mechanical structure of the shutter system increase and the manufacturing cost thereof increases.

(ii) Running members integral with the respective shutter curtains (shutter-curtain holding frames) strike against stopper members at high speeds at their shutter curtain running completion positions, with the result that a shock noise or a disagreeable vibration occurs.

(iii) It is impossible to stop the shutter curtains halfway in their running paths while they are running toward the respective stopper members, to cause each of the shutter curtains to run at various speeds, or to reduce the speed of each of the shutter curtains during running.

(iv) As the shutter speed of the shutter system is made higher, the running shock of the shutter curtains becomes larger. This leads to the problem that not only is a disagreeable vibration or noise caused but also a camera shake occurs. In general, since the curtain speed of the shutter system is adjusted so that its maximum shutter speed can be achieved, the shutter curtains run at the high speed even during a low shutter-speed operation which needs no such high curtain speed, with the result that the running shock becomes far larger. In addition, because of the low shutter-speed operation, a large camera shake occurs compared to a high shutter-speed operation.

(v) In the above-described conventional example, a large speed reduction ratio is adopted so that a shutter charging operation can be securely performed even if the voltage of a power source battery is low. For this reason, even if the battery voltage is high so that it is possible to obtain battery power greater than that required for the shutter charging operation, it is impossible to increase the speed of the shutter charging operation, so that it is impossible to increase the frame speed of the camera.

SUMMARY OF THE INVENTION

It is, therefore, an object of the present invention to provide a novel object driving apparatus arranged to drive a driven object by means of a driving spring, which apparatus is reduced in weight and size compared to this kind of conventional apparatus and is capable of stopping the driving object or reducing the speed thereof halfway in a running path or causing the driven object to run at various speeds, or which apparatus can prevent the driven object from vehemently striking against a mechanical stopper at the end of the running path and causing a vibration or a noise.

To achieve the above object, in accordance with one aspect of the present invention, there is provided an apparatus in which a known ultrasonic motor (vibration wave motor) is employed as a driving source for applying a braking force to the driven object and for charging the driving spring so that it is possible to eliminate a gear mechanism and a mechanical power transmission mechanism, such as a cam or a lever, which would have been required in the conventional apparatus. Further, the apparatus is capable of stopping the driven object or reducing the speed thereof halfway in the running path, and of causing the driven object to run at various speeds.

In accordance with another aspect of the present invention, there is provided a focal plane shutter system the leading and trailing curtains of which are provided with ultrasonic motors as their respective charging driving sources, and in which the leading and trailing curtains are simultaneously charged if the battery voltage is high and, if the battery voltage is low, the leading and trailing curtains are charged in series in such a way that the leading curtain is charged and, after the completion of the charging of the leading curtain, the trailing curtain is charged. Such a shutter system is capable of increasing the frame speed if the battery voltage is high and, even in the case of the low battery voltage, securely charging the leading and trailing curtains.

In accordance with another aspect of the present invention, there is provided a shutter system in which charging of the trailing curtain is started slightly later than the start of charging of the leading curtain in the case of the aforesaid simultaneous charging so that erroneous exposure is prevented from occurring during shutter charging. In accordance with this aspect of the present invention, there is also provided a camera in which the shutter charging is performed after the completion of a predetermined amount of film transportation so that an exposed frame can be protected against erroneous exposure.

In accordance with another aspect of the present invention, there is provided a shutter system in which a leading-curtain charging completion signal and a trailing-curtain charging completion signal are provided for detecting erroneous exposure during shutter charging and, if the trailing-curtain charging completion signal is detected earlier than the leading-curtain charging completion signal, it is determined that erroneous exposure has occurred, and a film is transported by one more frame to protect the next frame to be exposed.

In accordance with another aspect of the present invention, there is provided a shutter system in which when a shutter curtain is to be made to run by a spring force, an ultrasonic motor is driven in its standing wave mode so that the shutter curtain is made to start running by the spring force, or in which, during running of the shutter curtain by the spring force, it is possible to reduce the running speed of the shutter curtain or stop the running thereof halfway in a running path by adjusting the amplitude of the standing wave generated by the ultrasonic motor or stopping the generation of the standing wave by the ultrasonic motor.

In accordance with another aspect of the present invention, there is provided a shutter system which is arranged to detect the running phase of the shutter curtain and perform control for reducing the speed of the shutter curtain during the running thereof and timing control for stopping the running of the shutter curtain halfway in the running path.

In accordance with another aspect of the present invention, there is provided a shutter system which is capable of varying the running speed of a shutter leading curtain and that of a shutter trailing curtain.

In accordance with another aspect of the present invention, there is provided a shutter system which is arranged to detect the running position of a shutter leading curtain and that of a shutter trailing curtain and perform control for causing the respective shutter leading and trailing curtains to start running at their desired positions as well as for causing the respective shutter leading and trailing curtains to stop running at their desired positions.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

<First Embodiment>

FIGS. 1 through 11 diagrammatically show a focal plane shutter and a camera to which an object driving arrangement according to a first embodiment of the present invention is applied.

Figure 1:
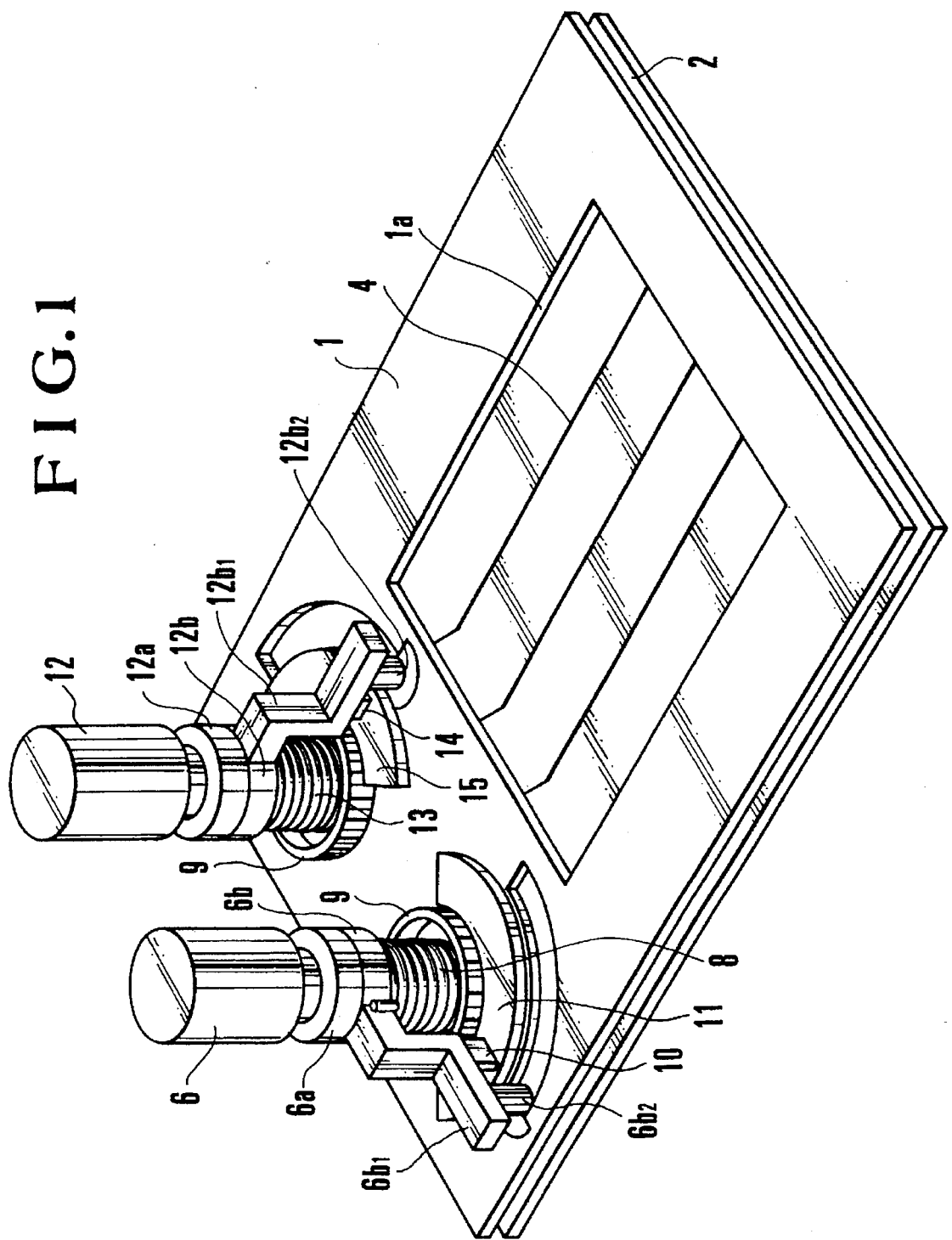
FIG. 1 is a diagrammatic perspective view showing a focal plane shutter according to a first embodiment of the present invention.
Figure 2:
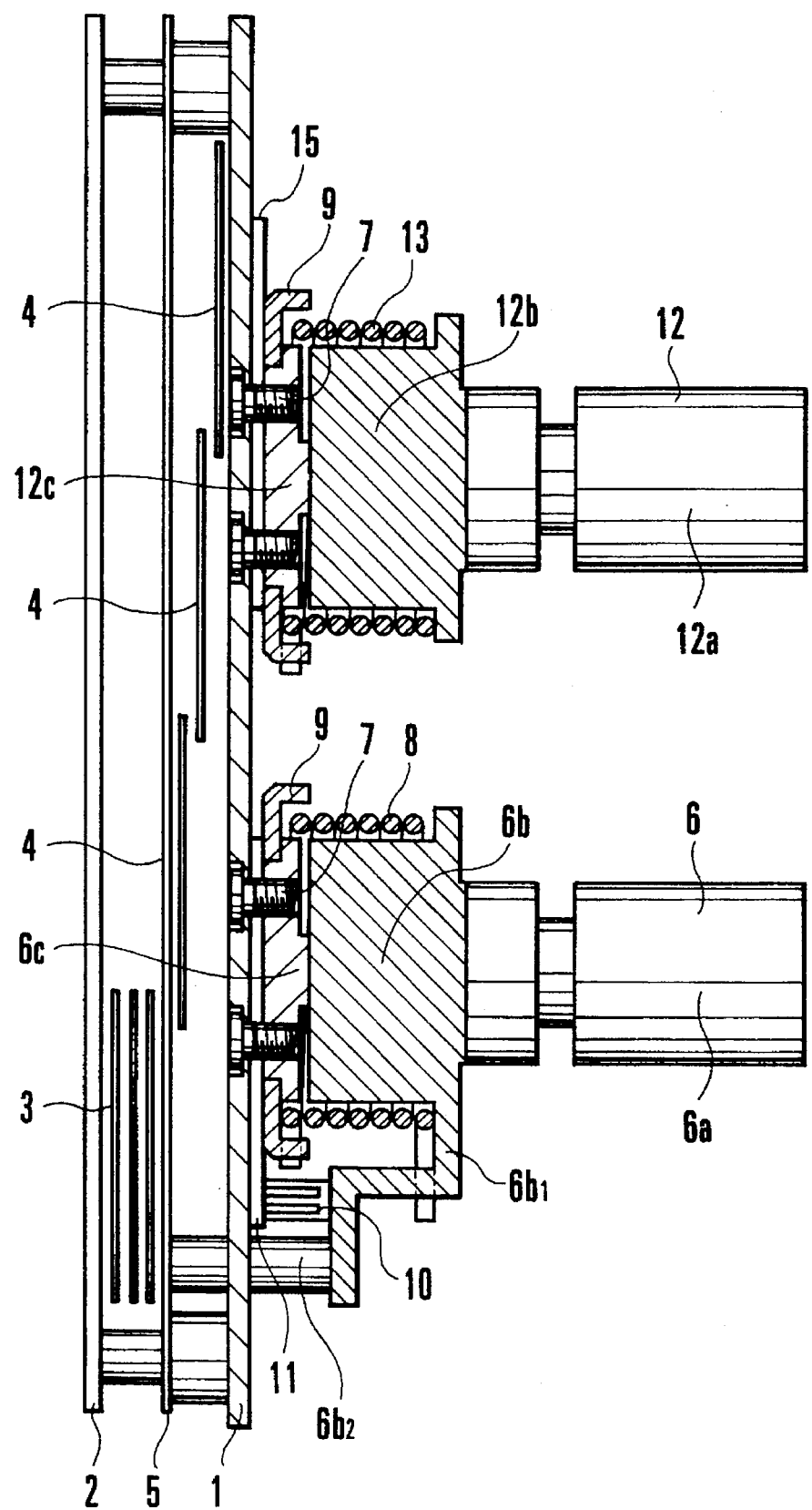
FIG. 2 is a diagrammatic cross-sectional view showing the focal plane shutter according to the first embodiment of the present invention.

FIG. 1 is a diagrammatic perspective view of the focal plane shutter according to the first embodiment, and FIG. 2 is a diagrammatic cross-sectional view of the focal plane shutter.

The arrangement shown in FIG. 1 includes a shutter base plate 1 having an exposure window 1a approximately in its middle portion in plan view, and a cover base plate 2 mounted in such a manner as to be spaced a predetermined distance apart from the shutter base plate 1. The cover base plate 2 has an exposure window (not shown) at a position corresponding to the position of the exposure window 1a.

A leading curtain (leading blade group) 3 and a trailing curtain (training blade group) 4 are provided between the shutter base plate 1 and the cover base plate 2, and are arranged to open and close the exposure windows by means of a known link mechanism. Further, to prevent the leading curtain 3 and the trailing curtain 4 from interfering with each other, a separating plate 5 is provided therebetween.

The shown arrangement also includes a first USM (ultrasonic motor, vibration type motor or vibration wave motor) 6 for charging a leading curtain driving spring 8 and for controlling the operation of the spring 8, the running speed of the leading curtain 3 and the restraining force (holding force) on the leading curtain 3, and a second USM 12 for charging a trailing curtain driving spring 13 and for controlling the operation of the spring 13, the running speed of the trailing curtain 4 and the restraining force (holding force) on the trailing curtain 4. Known USMs are used as the first and second USMs 6 and 12, respectively. However, since the function and operation of the USMs are utterly different from those of known electromagnet motors, the function and operation of each of the first and second USMs 6 and 12 will be described below with reference to FIGS. 3 through 6.

Figure 3:
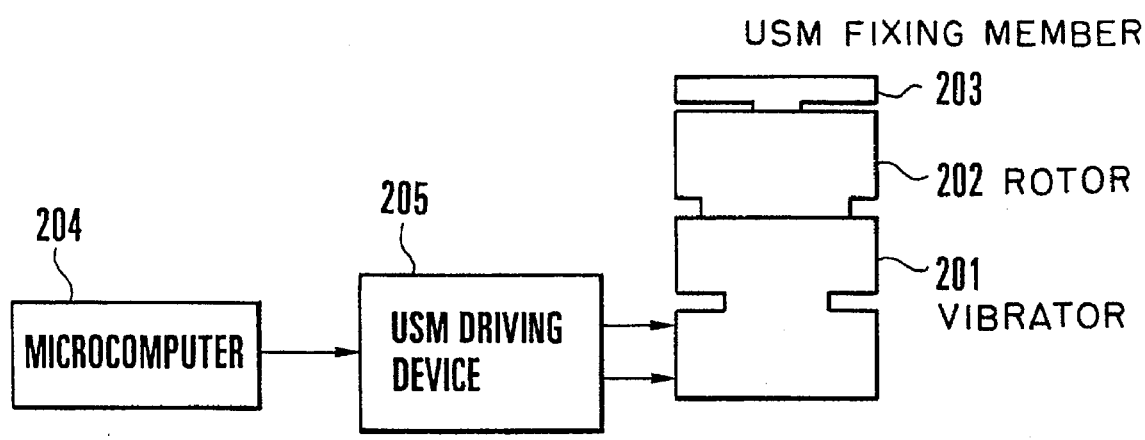
FIG. 3 is a schematic view showing the electrical arrangement of a known ultrasonic motor (USM)

FIG. 3 is a schematic diagram showing an electrical arrangement for driving such a USM. A microcomputer 204 is provided for controlling the USM, and outputs a control signal. A known USM driving device 205 is made up of constituent elements such as a D/A converter, a VCO (voltage-controlled oscillator), a phase shifter and an amplifier. The USM is made up of a vibrator 201, a rotor 202 and a USM fixing member 203. The following is a description of the case where the vibrator 201 of the USM is made to generate a travelling wave and a standing wave.

Travelling Wave: If the USM driving device 205 receives a signal from the microcomputer 204 and causes the vibrator 201 of the USM to generate a travelling wave, the rotor 202 of the USM can be made to rotate in an arbitrary direction and at an arbitrary speed. The travelling wave is formed by applying signals of two phases which are shifted from each other by, for example, 90°, to piezoelectric elements of two phases. Speed control is performed by varying a driving frequency relative to the vibrator 201. (By applying frequency signals of different phases to individual electromechanical energy conversion elements, such as the piezoelectric elements of two phases provided on the vibrator 201, the travelling wave is generated so that the rotor 202 is driven.)

Standing Wave: To cause the vibrator 201 of the USM to generate a standing wave, a signal from the microcomputer 204 is applied to the USM driving device 205 so that the USM driving device 205 changes signals of two different phases into signals of the same phase and supplies the signals of the same phase to the vibrator 201, or supplies either one of the signals of two different phases to the vibrator 201. The amplitude of the standing wave can be controlled by varying the frequency thereof. (By applying a frequency signal to only one of the two-phase electromechanical energy conversion elements or by applying frequency signals of the same phase to the respective two-phase electromechanical energy conversion elements, the standing wave is generated so that the pressure (resistance) or friction force between the rotor 202 and the vibrator 201 is decreased.)

The resistance against which the rotor 202 is rotated from the outside varies with the amplitude of the standing wave generated by the vibrator 201. The resistance of the rotor 202 will be described below.

Figure 4:
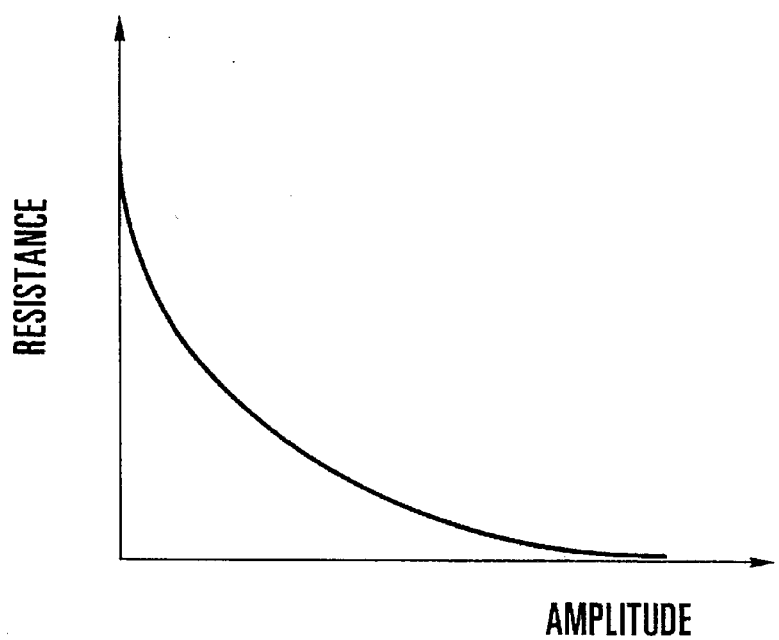
FIG. 4 is a graphic representation aiding in explaining the relationship between the amplitude of a standing wave and resistance in the USM.

The relationship between the amplitude of the standing wave and the resistance against which the rotor 202 is rotated is shown in FIG. 4. As can be seen from FIG. 4, when the amplitude is zero, the resistance reaches its maximum, and the resistance of the maximum value serves as a holding torque. As the amplitude becomes larger, the resistance becomes smaller.

Figure 5:
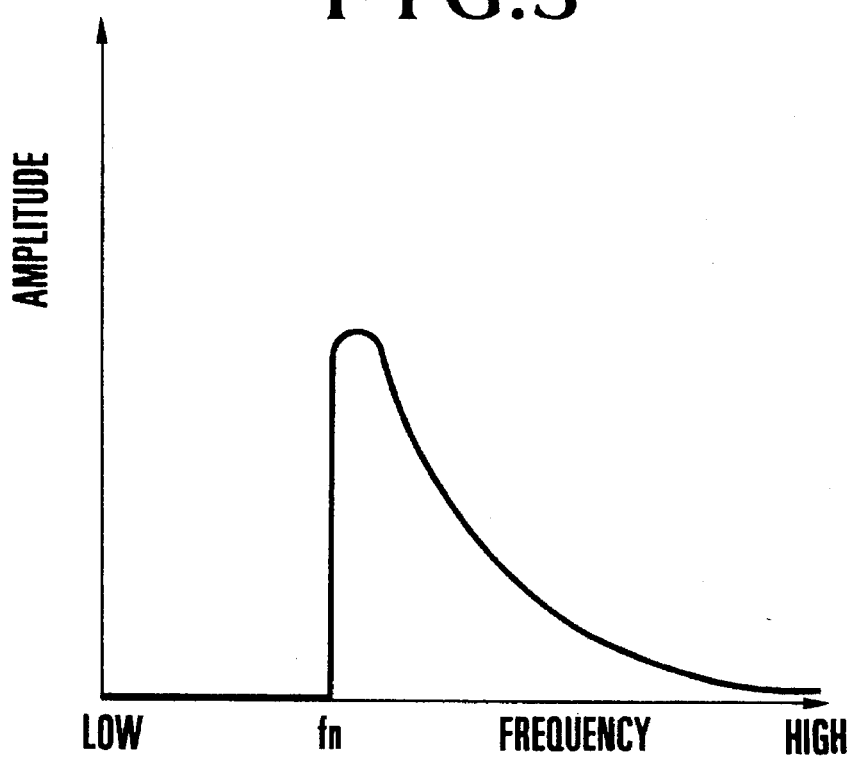
FIG. 5 is a graphic representation aiding in explaining the relationship between the frequency and the amplitude of the standing wave in the USM.
Figure 6:
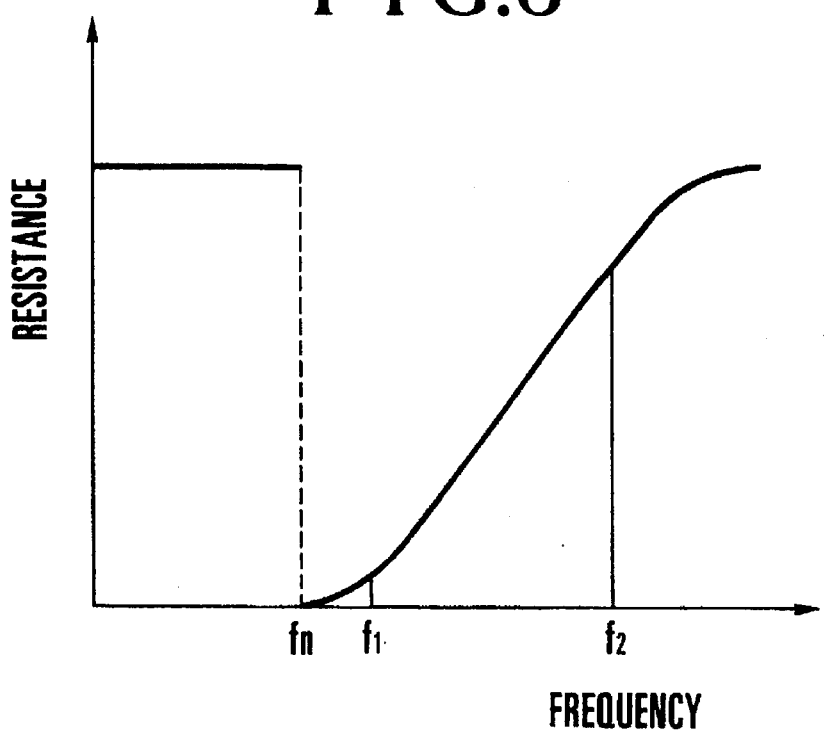
FIG. 6 is a graphic representation aiding in explaining the relationship between the frequency of the standing wave and the resistance in the USM.

The relationship between the driving frequency and the amplitude is shown in FIG. 5. As can be seen from FIG. 5, the amplitude remains zero until the driving frequency reaches a resonance frequency $f_n$, and when the resonance frequency $f_n$ is reached, the amplitude reaches its maximum. As the driving frequency becomes higher than the resonance frequency $f_n$, the amplitude becomes smaller. Accordingly, the relationship between the driving frequency and the resistance against which the rotor 202 is rotated is as shown in FIG. 6. As is apparent from FIG. 6, the resistance remains the maximum until the driving frequency reaches the resonance frequency $f_n$, and becomes zero at or near the resonance frequency $f_n$. As the driving frequency becomes higher than the resonance frequency $f_n$, the resistance becomes gradually larger.

In the first embodiment utilizing the above-described feature of the USM, the vibrator 201 is made to generate the travelling wave to drive the rotor 202 while charging the corresponding one of the leading and trailing curtain driving springs by means of the rotor 202. When the driving spring is brought into its charging completion state, the generation of the travelling wave by the vibrator 201 is made to stop. At this time, the resistance or friction force against which the rotor 202 is rotated from the outside is the maximum and the holding torque is generated at the stop position of the rotor 202, so that the rotor 202 is prevented from being returned by the spring force of the driving spring.

When the rotor 202 held in that state is to be driven, the vibrator 201 is made to generate a standing wave of frequency $f_1$ slightly higher than the resonance frequency $f_n$ shown in FIG. 6, thereby reducing the resistance or friction force to approximately zero. Thus, it is possible to drive the associated shutter curtain which is an object to be driven by the spring force of the charged driving spring. Also, it is possible to reduce the speed of the driving by generating a standing wave of frequency $f_2$ which is higher than the frequency $f_1$, or it is possible to obtain a brake effect by first generating a standing wave of frequency $f_1$ and then switching the standing wave to a standing wave of frequency $f_2$ immediately before the end of the driving. Also, by gradually varying the driving frequency from $f_1$ toward $f_2$, it is possible to reduce a shock due to hard braking or a load applied to the USM.

Referring again to FIGS. 1 and 2, the structure of the shutter according to the first embodiment will be described below.

The above-described leading-curtain driving USM 6 (the ultrasonic motor 6 for driving the shutter leading curtain driving spring 8) is made up of a vibrator 6a, a rotor 6b and a USM fixing member 6c, and the USM 6 is fixed by screws 7 concentrically to a driving link for the leading curtain 3. The leading curtain driving spring 8 for driving the leading curtain 3 is disposed around the rotor 6b so that the entire size of the shutter can be reduced.

The leading curtain driving spring 8 is hooked on a ratchet 9 for adjusting a curtain speed and a leading curtain driving arm portion $6b_1$ which is formed integrally with the rotor 6b. The leading curtain driving arm portion $6b_1$ is urged to turn in the clockwise direction by the leading curtain driving spring 8.

The rotor 6b is provided with a leading curtain driving pin $6b_2$ for interlocking the rotor 6b with the leading curtain 3 during the rotation of the rotor 6b.

The rotor 6b is further provided with a brush 10 for detecting the angle of rotation of the rotor 6b. A leading-curtain phase circuit board 11 is plated with a phase pattern for detection of the position of the brush 10, and the angle of rotation of the leading curtain driving arm portion $6b_1$ is detected through the contact between the brush 10 and the leading-curtain phase circuit board 11. The ratchet 9 is rotatably supported and is engaged with a stop claw (not shown), thereby adjusting the running speed of the shutter blade group 3.

The ultrasonic motor 12 for charging the trailing curtain driving spring 13 is made up of a vibrator 12a, a rotor 12b and a USM fixing member 12c, and the trailing curtain driving USM 12 is fixed by the screws 7 concentrically to a driving link for the trailing curtain 4. The trailing-curtain arrangement is constructed similarly to the leading-curtain arrangement, and the rotor 12b is provided with a trailing curtain driving arm portion $12b_1$ and a trailing curtain driving pin $12b_2$. The trailing curtain driving arm portion $12b_1$ is urged in the clockwise direction by the trailing curtain driving spring 13 disposed around the rotor 12b. The rotor 12b is provided with a brush 14, and the angle of rotation of the trailing curtain driving arm portion $12b_1$ is detected through the contact between the brush 14 and a trailing-curtain phase circuit board 15.

Figure 7:
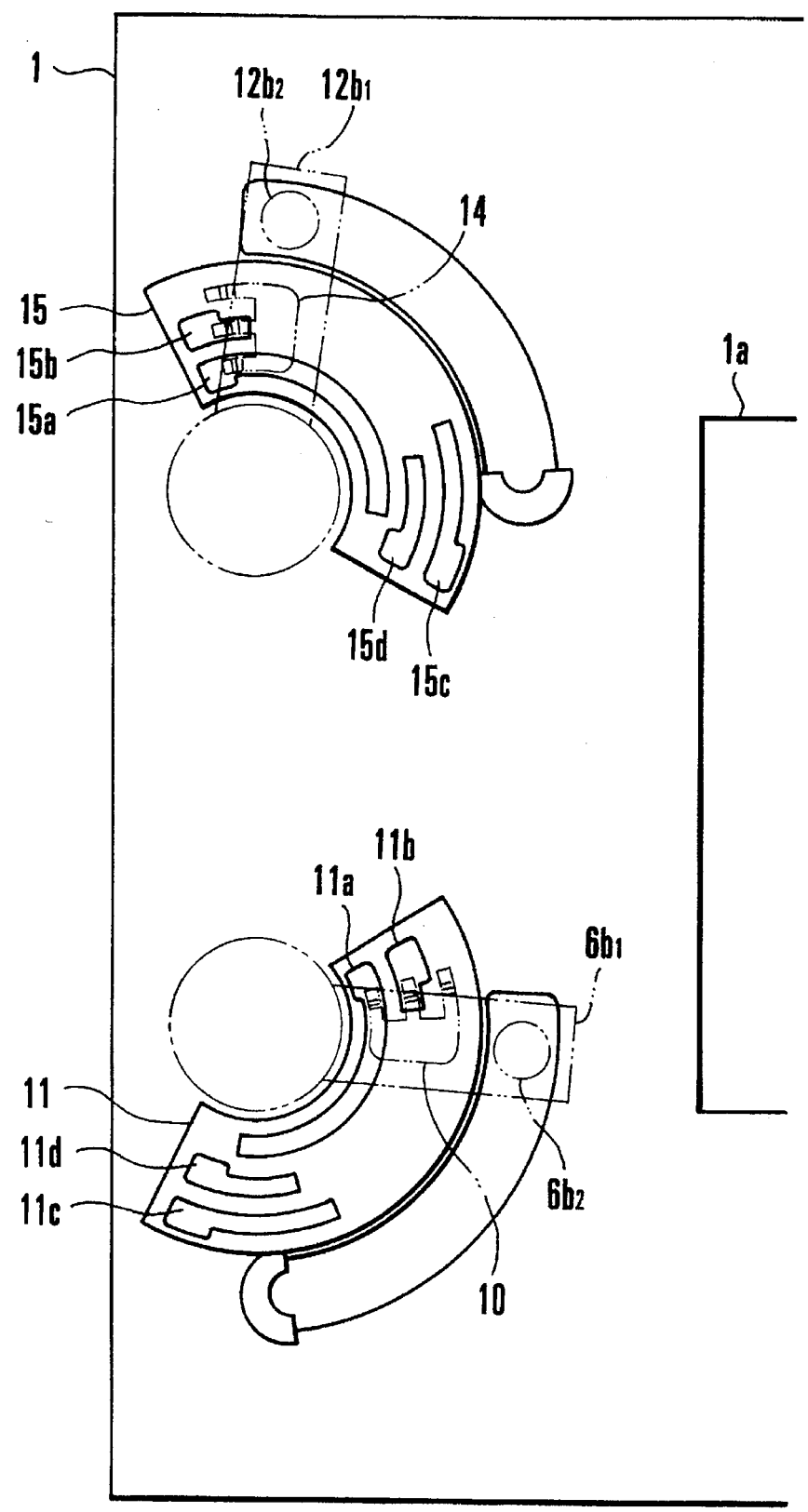
FIG. 7 is a schematic plan view showing the charging completion state of the first embodiment shown in FIG. 1.
Figure 8:
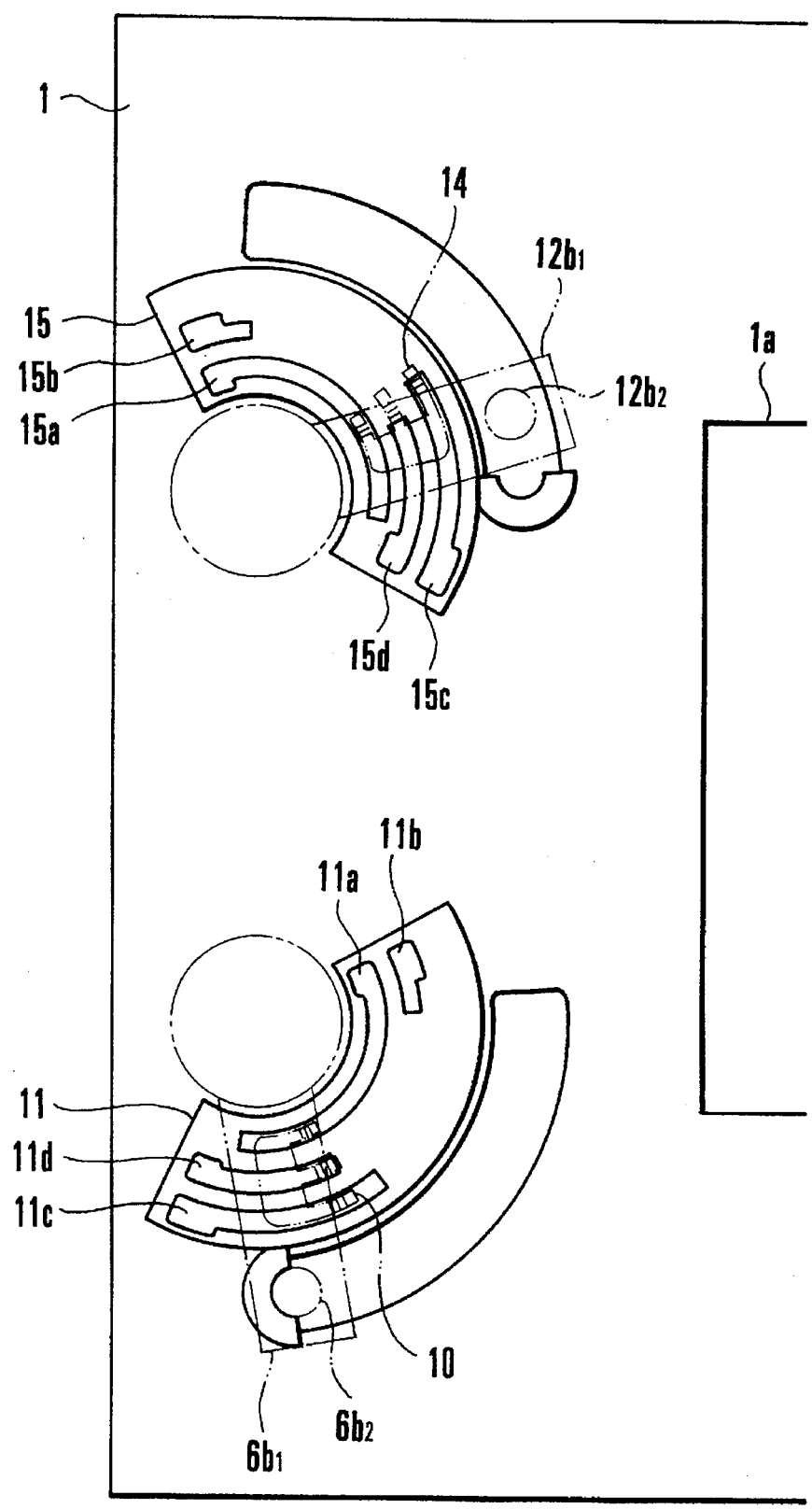
FIG. 8 is a schematic plan view showing a state in which the shutter according to the first embodiment shown in FIG. 1 is running.

FIGS. 7 and 8 are enlarged plan views of the leading-curtain phase circuit board 11 and the trailing-curtain phase circuit board 15. The leading-curtain phase circuit board 11 and the trailing-curtain phase circuit board 15 respectively include ground patterns 11a and 15a for supply of a ground potential, patterns 11b and 15b for detection of the charging completion (running readiness) state, patterns 11c and 15c for detection of a brake signal immediately before the end of running, and patterns 11d and 15d for detection of a running completion state. The detection of each of these states is performed by detecting whether an electrical conduction occurs when the brushes 10 and 14 are respectively brought into contact with the corresponding ones of the patterns 11b, 15b; 11c, 15c; and 11d, 15d. In the shown arrangement, a detection signal of high level represents a nonconductive state, while a detection signal of low level represents a conductive state, and phase detection is performed by detecting the low level.

FIG. 7 shows that both the leading-curtain arrangement and the trailing-curtain arrangement are placed in their charging completion states (start readiness positions) and the charging completion signal patterns 11b and 15b are detected.

FIG. 8 shows that the running completion signal pattern 11d is detected in the leading-curtain arrangement, while the running completion signal pattern 15d is detected in the trailing-curtain arrangement.

Figure 9:
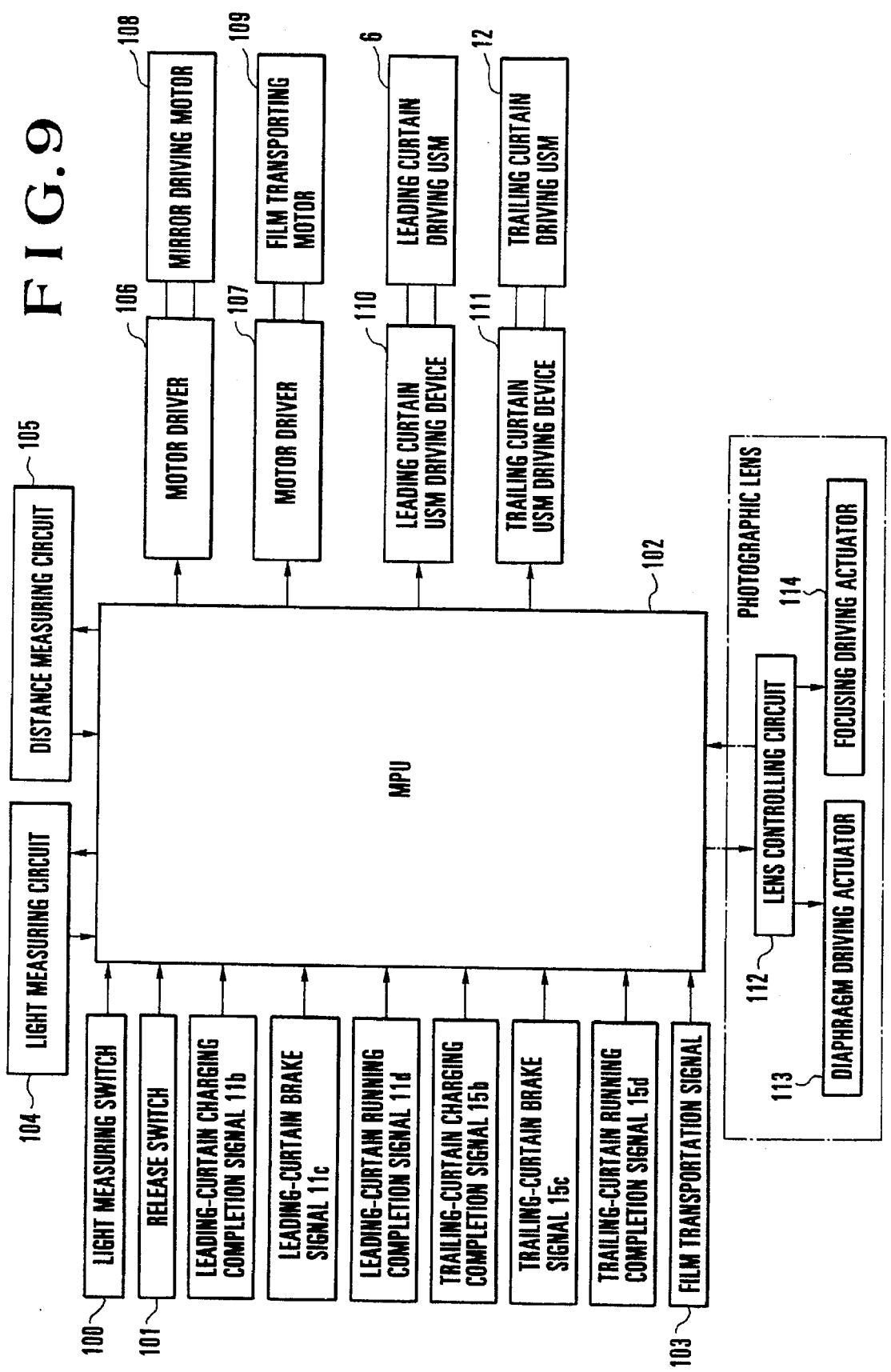
FIG. 9 is a block diagram showing the electrical arrangement of a camera having the focal plane shutter shown in FIG. 1.

FIG. 9 is a block diagram showing the control circuit of a camera provided with the shutter according to the first embodiment.

In the arrangement shown in FIG. 9, a light measuring switch 100 is arranged to be turned on at the first stroke of a release button (not shown), and a release switch 101 is arranged to be turned on at the second stroke of the release button. The signals of these switches 100 and 101 are inputted into a microprocessor (MPU) 102. The MPU 102 also receives the aforesaid detection pattern signals for detection of the positions of the leading curtain 3 and the trailing curtain 4, which signals are obtained by detecting the angles of rotation of the rotors 6a and 6b of the respective ultrasonic motors 6 and 12, i.e., the leading-curtain charging completion signal 11b, the leading-curtain brake signal 11c, the leading-curtain running completion signal 11d, the trailing-curtain charging completion signal 15b, the trailing-curtain brake signal 15c and the trailing-curtain running completion signal 15d. The MPU 102 further receives a film transporting signal 103 from film transportation detecting means (not shown). A light measuring circuit 104 and a distance measuring circuit 105 are supplied with information indicative of their respective operational timings from the MPU 102, and then the respective outputs of the light measuring circuit 104 and the distance measuring circuit 105 are transmitted to the MPU 102. A motor driver 106 has a bridge circuit which enables the motor driver 106 to energize and drive a mirror driving motor 108 in the forward and backward directions and which can switch the motor driver 106 between such driving-enable state and an electrically braked state utilizing short-circuiting. A motor 107 has a bridge circuit similar to that of the motor driver 106 in connection with the film transporting motor 109.

The leading curtain driving USM 6 and the trailing curtain driving USM 12 are respectively connected to a leading curtain USM driving device 110 and a trailing curtain USM driving device 111. Each of the leading curtain USM driving device 110 and the trailing curtain USM driving device 111 is made up of a D/A converter, a VCO, a phase shifter, an amplifier and other associated elements.

If the shutter is to be operated, a signal from the MPU 102 is applied to the leading curtain USM driving device 110 and the leading curtain USM driving device 110 causes the vibrator 6a of the leading curtain driving USM 6 to generate a standing wave, thereby cancelling the holding force on the leading curtain 3. Thus, the leading curtain 3 is made to run by the leading curtain driving spring 8 which has previously been charged. After a predetermined shutter time elapses, a signal from the MPU 102 is applied to the trailing curtain USM driving device 111 and the trailing curtain USM driving device 111 causes the vibrator 12a of the trailing curtain driving USM 12 to generate a standing wave, thereby lowering the holding or fraction force of the USM 12 on the trailing curtain 4. Thus, the trailing curtain 4 is made to run by the trailing curtain driving spring 13 which has previously been charged.

If the shutter is to be charged, signals from the MPU 102 are respectively applied to the leading curtain and trailing curtain USM driving devices 110 and 111 and the leading curtain and trailing curtain USM driving devices 110 and 111 respectively cause the vibrators 6a and 12a of the leading curtain and trailing curtain driving USMs 6 and 12 to generate travelling waves, thereby charging the associated driving springs 8 and 13.

In this arrangement, no mechanical connection means is used as the interface between a photographic lens and a camera body (not shown), and no mechanical connection means is used between the MPU 102 of the camera body and a lens controlling circuit 112. Only electrical communication is performed between the MPU 102 of the camera body and the lens controlling circuit 112. However, the electrical power required for driving the photographic lens is supplied from the camera body.

The photographic lens includes a diaphragm driving actuator 113 and a focusing driving actuator 114 in itself. The MPU 102 outputs an instruction indicative of a driving timing and causes the lens controlling circuit 112 to drive the diaphragm driving actuator 113 and the focusing driving actuator 114.

The operation of the focal plane shutter according to the first embodiment will be described below. Initially, as shown in FIG. 7, the leading curtain 3 and the trailing curtain 4 are respectively held in their charging completion states by the holding or friction forces of the leading curtain and trailing curtain driving USMs 6 and 12 with the leading curtain driving spring 8 and the trailing curtain driving spring 13 placed in their charged states while being urged in their clockwise directions. If a release operation is performed, the MPU 102, via the leading curtain USM driving device 110, causes the vibrator 6a of the leading curtain driving USM 6 to generate a standing wave of frequency $f_1$ somewhat higher than the resonance frequency $f_n$.

As is apparent from FIG. 6, the resistance friction at the frequency $f_1$ is approximately zero. Accordingly, the leading curtain driving arm portion $6b_1$ starts to turn in the clockwise direction owing to the spring force of the leading curtain driving spring 8, and the leading curtain 3 also starts to run by the action of the leading curtain driving pin $6b_2$. The leading curtain 3 gradually increases in speed, but if the leading curtain 3 strikes against a stopper at the increased speed, a disagreeable shock or noise will occur. For this reason, in the first embodiment, the angle of rotation of the leading curtain driving arm portion $6b_1$ is detected through the contact between the brush 10 provided on the rotor 6b and the leading-curtain phase circuit board 11, and when the leading-curtain brake signal 11c is detected immediately before the end of the running, the MPU 102, via the leading curtain USM driving device 110, causes the vibrator 6a of the leading curtain driving USM 6 to generate a standing wave whose frequency $f_2$ is higher than the frequency $f_1$ as shown in FIG. 6.

Since the resistance at the frequency $f_2$ is considerably large compared to the resistance at the frequency $f_1$, the rotor 6b is braked to reduce the speed at which the leading curtain 3 and the leading curtain driving arm portion $6b_1$ strike against the stopper, thereby reducing a camera shake and the disagreeable shock or noise.

When the leading-curtain running completion signal 11d is detected, the generation of the standing wave is brought to an end, and the leading curtain 3 and the associated elements are prevented from bounding, by the stop torque of the leading curtain driving USM 6. Then, when a shutter time elapses after the start of the running of the leading curtain 3, the MPU 102, via the trailing curtain USM driving device 111, causes the vibrator 12a of the trailing curtain driving USM 12 to generate a standing wave of frequency $f_1$ in a manner similar to that described above in connection with the operation of the leading curtain 3. At this time, the holding torque becomes approximately zero, and the trailing curtain driving arm portion $12b_1$ is made to turn in the clockwise direction by the spring force of the trailing curtain driving spring 13, thereby causing the trailing curtain 4 to run. Similarly to the leading curtain 3, when the trailing-curtain brake signal 15c is detected immediately before the end of the running of the trailing curtain 4, the frequency of the standing wave generated by the vibrator 12a of the trailing curtain driving USM 12 is switched from $f_1$ to $f_2$, thereby braking the trailing curtain 4. When the trailing-curtain running completion signal 15d is detected, the generation of the standing wave is brought to an end, and the trailing curtain 4 and the associated elements are prevented from bounding, by the holding torque of the trailing curtain driving USM 12.

If a shutter time is selected from a low-speed range, it is possible to provide a sufficient shutter accuracy even if a slow curtain speed is selected. Also, in the low-speed range, camera shakes tend to occur more easily than in a high-speed range. For these reasons, it is desirable that the curtain speed be made slow to some extent in the low-speed range.

In the first embodiment, it is possible to suppress the running speed of each shutter curtain by causing the vibrator of the associated USM to generate from the beginning a standing wave, such as that of frequency $f_2$ shown in FIG. 6, which can provide a resistance which is large to some extent, with the shutter curtain placed in its charged state.

To brake the shutter curtain, after a brake signal is detected, the frequency of the standing wave generated by the vibrator of the associated USM is rapidly varied from $f_1$ to $f_2$. However, the hard braking force obtained at this time occasionally causes a shock or applies an extremely large load to the USM. For this reason, it is also preferable to adopt an arrangement which gradually varies the standing wave generated by the vibrator of the USM to increase the resistance progressively.

When the end of the running of the trailing curtain 4 is detected, the film transporting motor 109 is energized to perform film transportation. The film transportation is performed before shutter charging so that exposed frames can be protected even if erroneous exposure occurs during shutter charging as will be described later.

After the film transportation is performed, the shutter charging is started. According to the first embodiment, since the two independent USMs 6 and 12 are respectively provided for the leading curtain 3 and the trailing curtain 4, it is possible to achieve an arrangement in which if a battery voltage is high and a large amount of electrical power can be employed, the leading curtain 3 and the trailing curtain 4 are simultaneously charged so that as high a frame speed as possible can be utilized, whereas even if the battery capacity is low and a small amount of electrical power can only be employed, the leading curtain 3 and the trailing curtain 4 are charged in series so that shutter charging can be securely performed. However, in the case of the simultaneous charging, if the trailing curtain 4 is charged before the leading curtain 3, erroneous exposure occurs during the charging operation. For this reason, in the simultaneous charging, the trailing curtain 4 is charged in a slight time lag after the start of the charging of the leading curtain 3. Also, if the trailing-curtain charging completion signal 15b comes before the leading-curtain charging completion signal 11b, it is determined that erroneous exposure has occurred during the charging operation, and the film transporting motor 109 is energized to transport the film by one more frame in order to protect the next frame of the film to be exposed. Accordingly, it is possible to prevent each exposed frame of the film from being erroneously exposed.

The shutter charging operation utilizing the USMs will be described below.

The leading curtain USM driving device 110 receives a signal from the MPU 102 and causes the vibrator 6a of the leading curtain driving USM 6 to generate a travelling wave. The rotor 6b turns in the counterclockwise direction against the leading curtain driving spring 8 which urges the rotor 6b in the clockwise direction. The trailing-curtain arrangement starts its operation slightly later than the leading-curtain arrangement, and the vibrator 12a of the trailing curtain driving USM 12 is made to generate a travelling wave to cause the rotor 12b to turn in the counterclockwise direction against the trailing curtain driving spring 13. When the brush 10 mounted on the leading curtain driving arm portion $6b_1$ detects the leading-curtain charging completion signal 11b through the contact with the leading-curtain phase circuit board 11, the generation of the travelling wave by the vibrator 6a is brought to a stop. At this time, since the spring force of the leading curtain driving spring 8 is smaller than the holding torque obtained when the leading curtain driving USM 6 is stopped, the leading curtain 3 and the leading curtain driving arm portion $6b_1$ are held in their charging completion positions.

The trailing-curtain arrangement also performs a similar operation. When a trailing-curtain charging completion signal 16b is detected, the generation of the travelling wave by the vibrator 12a is brought to a stop. The trailing curtain 4 and the trailing curtain driving arm portion $12b_1$ are held in their charging completion positions by the holding torque of the trailing curtain driving USM 12.

The above-described charging operation is performed when the battery voltage is higher than a predetermined level, and is capable of increasing the frame speed by simultaneously charging the leading curtain 3 and the trailing curtain 4.

If the battery voltage is lower than the predetermined level and the two charging driving sources are difficult to drive simultaneously, the leading curtain driving USM 6 is first driven to charge the leading curtain driving spring 8, and after the leading-curtain running completion signal 11d has been detected, the trailing curtain driving USM 12 is driven to charge the trailing curtain driving spring 13. Accordingly, even if the battery voltage is low, it is possible to securely perform a shutter charging operation.

Figure 10A:
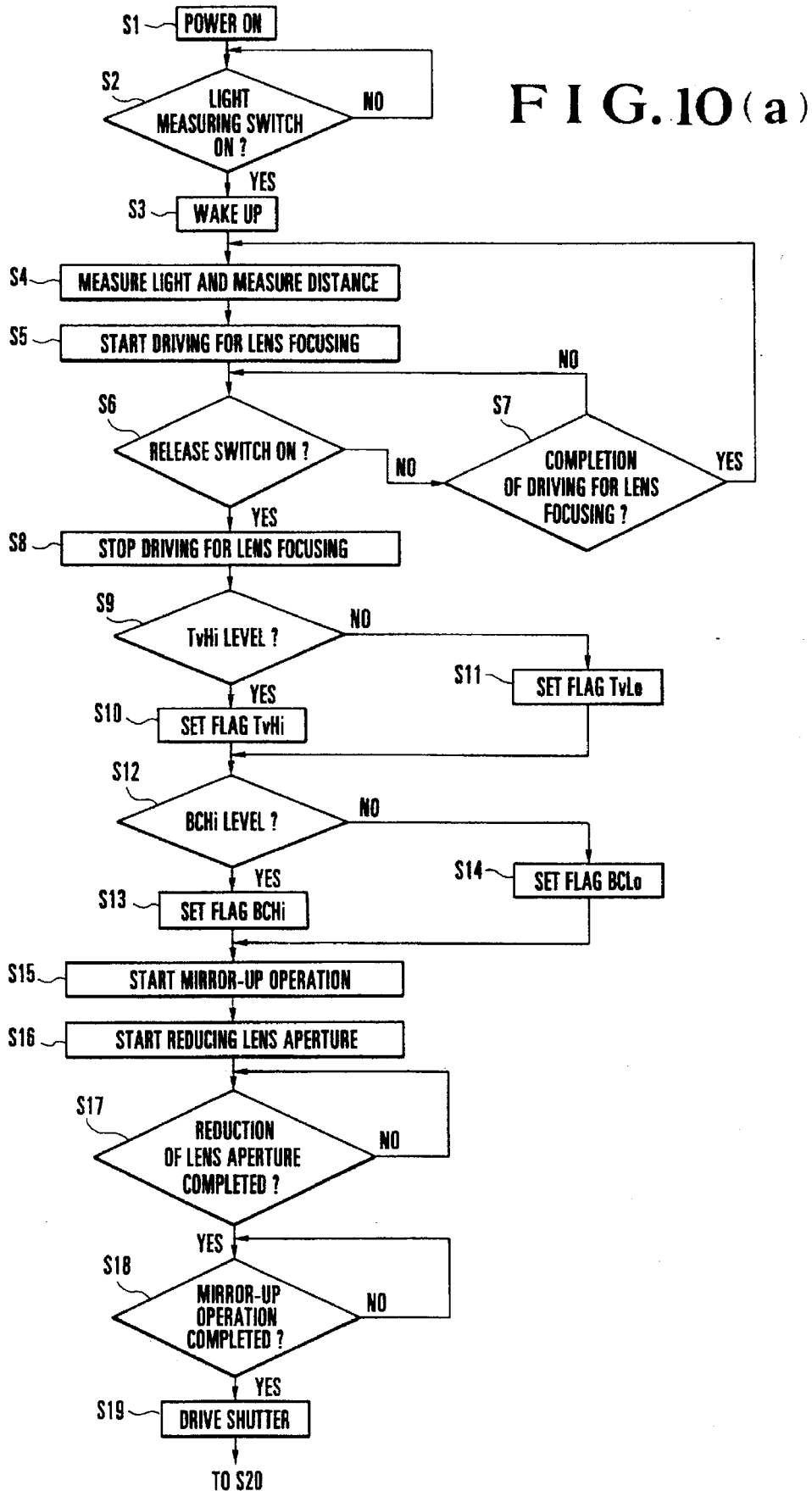
FIGS. 10(a) and 10(b) show a flowchart of the operation of the camera having the focal plane shutter shown in FIG. 1.
Figure 10B:
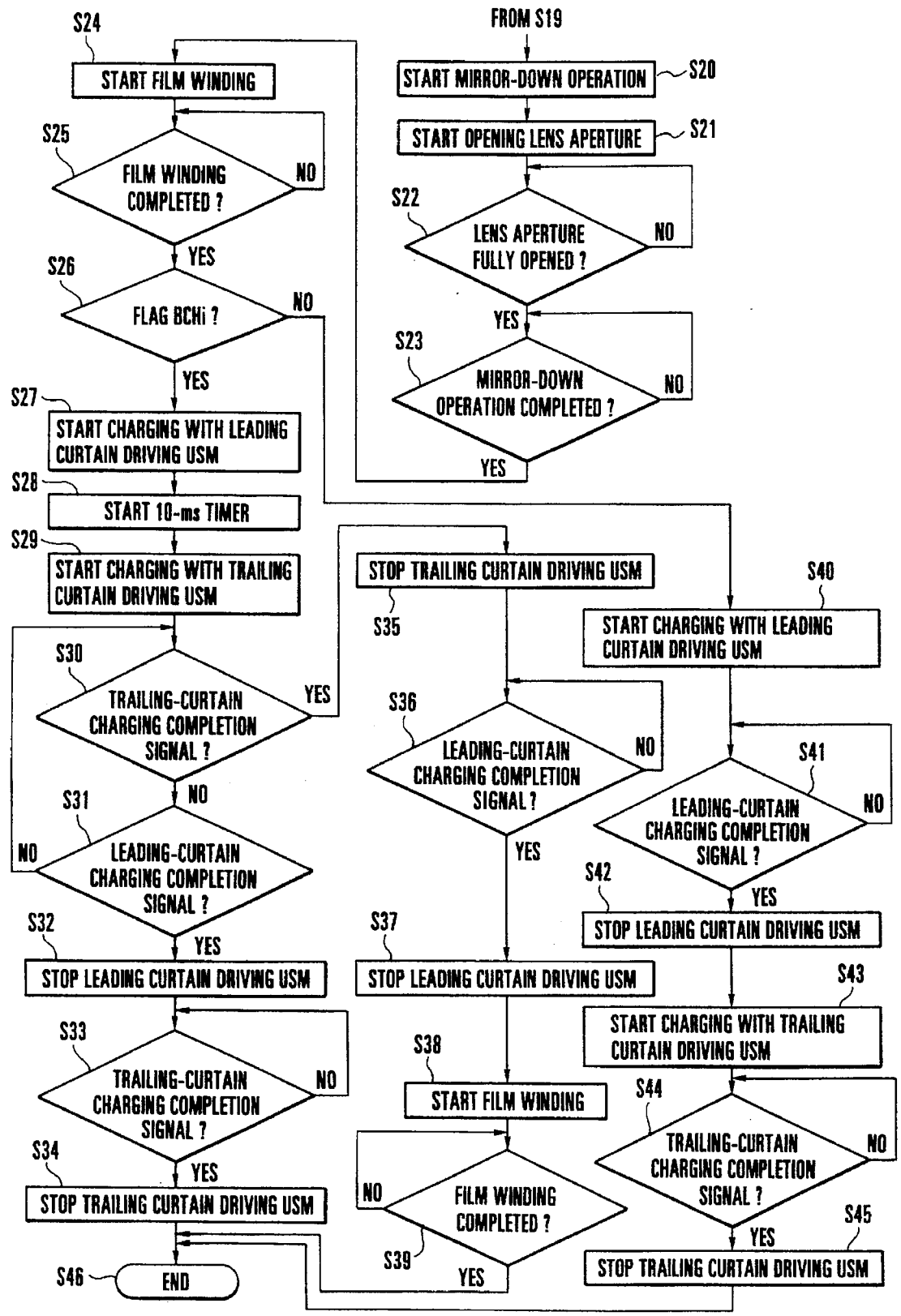
Figure 11A:
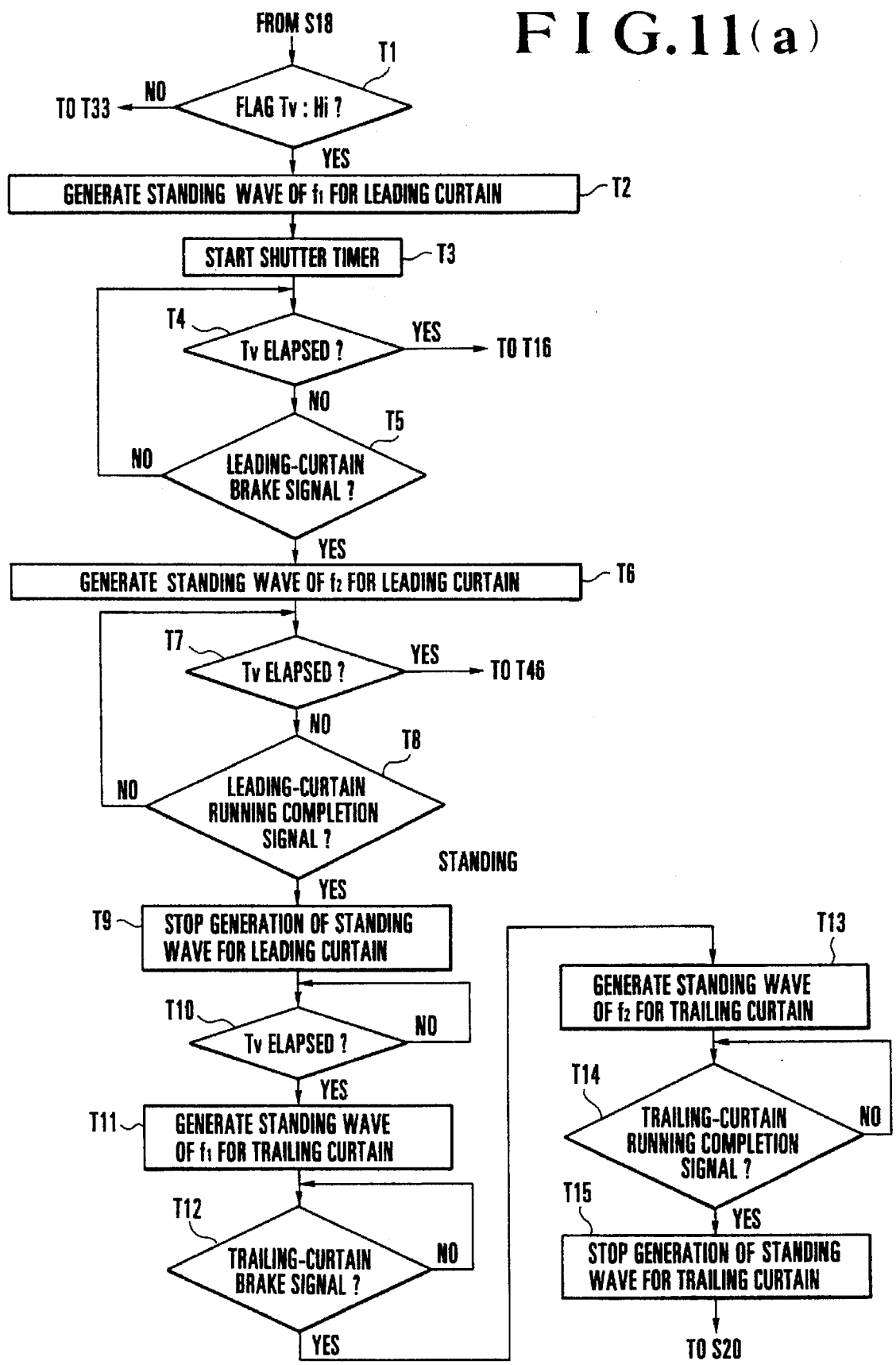
FIGS. 11(a), 11(b), 11(c) and 11(d) show a flowchart of the operation of the camera having the focal plane shutter shown in FIG. 1.
Figure 11B:
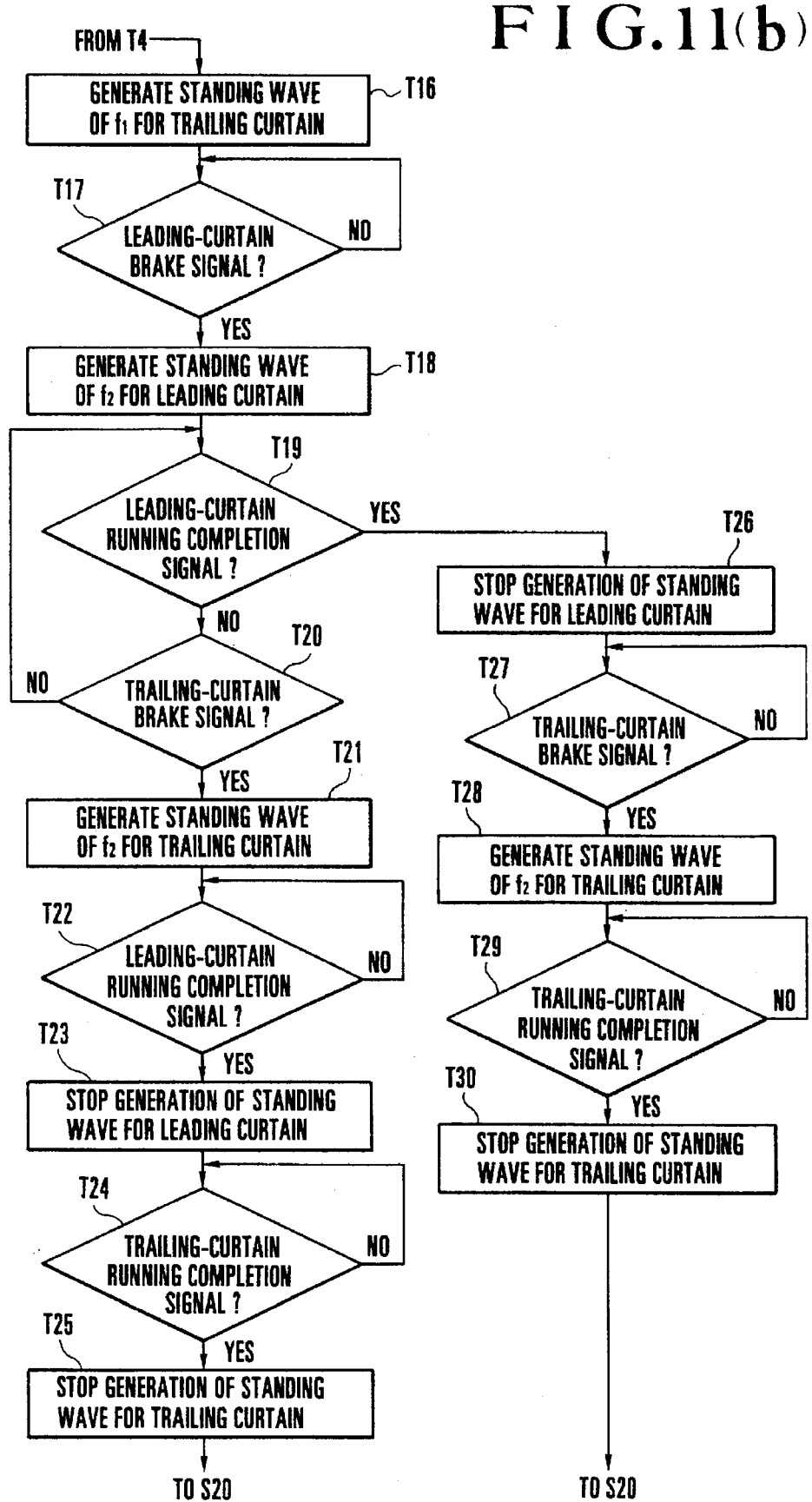
Figure 11C:
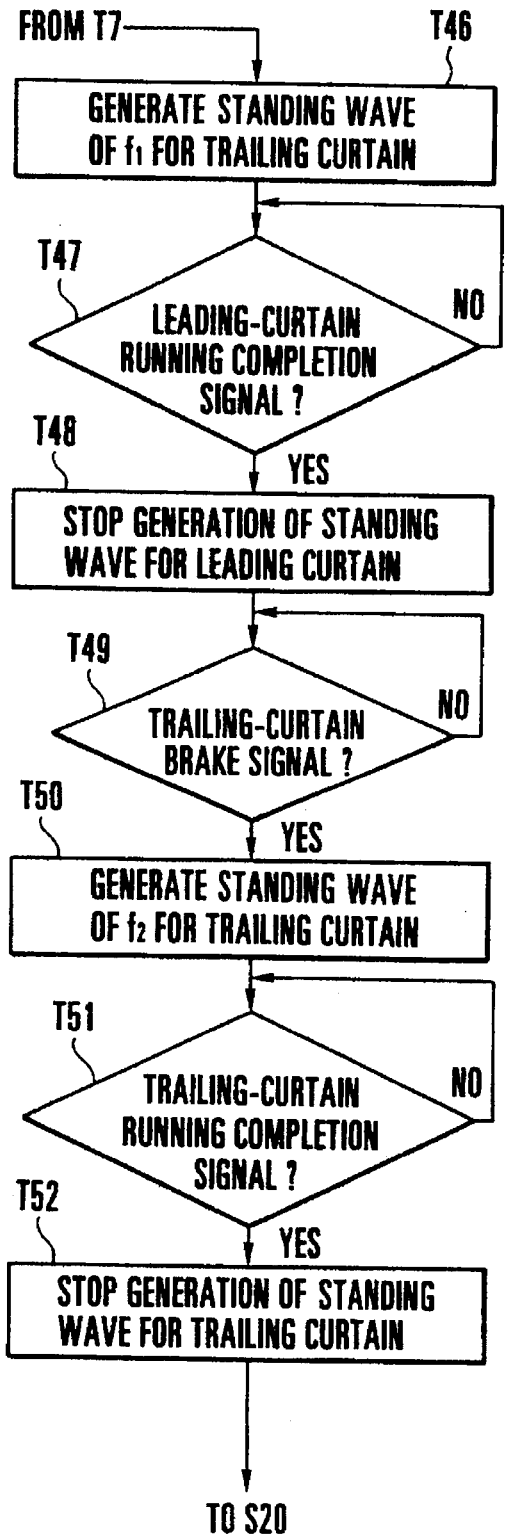
Figure 11D:
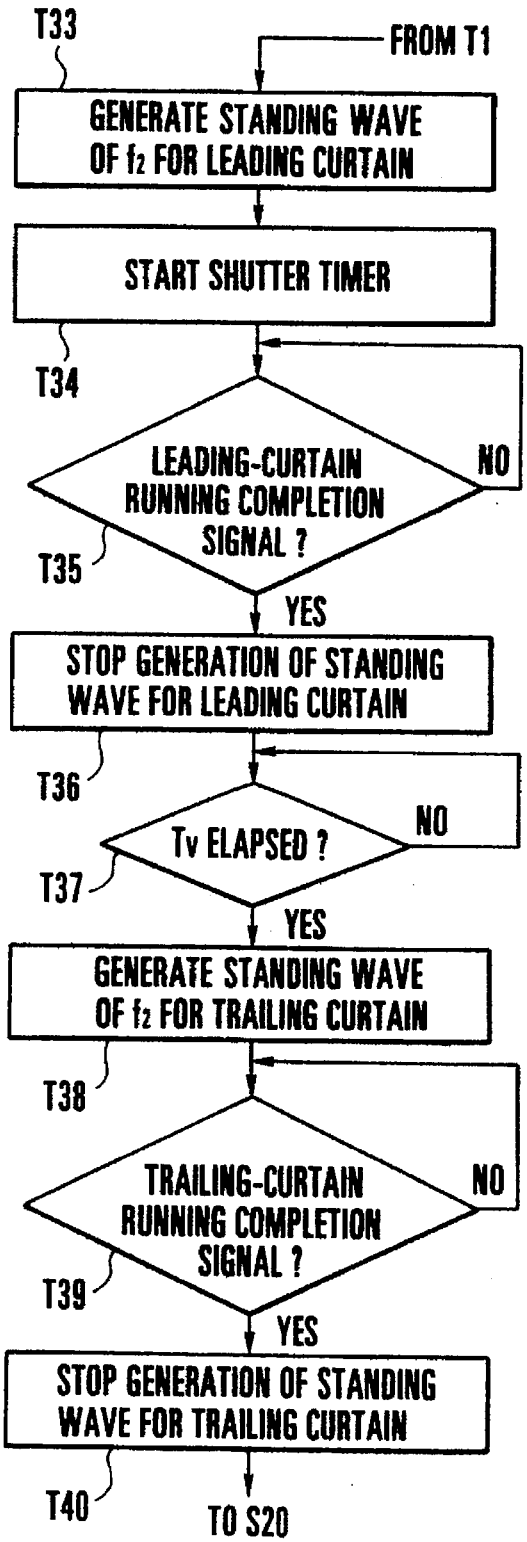

The operation of the camera having the arrangement shown in FIG. 9 according to the first embodiment will be described below with reference to the flowchart shown in FIGS. 10(a) and 10(b).

If the light measuring switch 100 is turned on (S2) with a power source switch (not shown) turned on in Step S1, a wake-up operation is performed to start up a DC/DC converter (not shown), thereby bringing the individual circuits into their operative states (S3).

Then, the light measuring circuit 104 and the distance measuring circuit 105 are operated to determine a shutter time and an aperture value (S4). On the basis of the measured-distance information provided by the distance measuring circuit 105, the focusing driving actuator 114 of the photographic lens is operated to start driving for lens focusing (S5).

If the release switch 101 is not turned on in Step S6, the process proceeds to Step 7 in which it is determined whether the driving for lens focusing has been completed. If it is determined that the driving for lens focusing has been completed (S7), the process returns to Step S4 in which the above-described light and distance measuring operations are again performed. If the release switch 101 is turned on during this time, the driving for lens focusing is brought to a stop (S8) and the process enters a photographic sequence. In the first embodiment, if the release switch 101 is turned on, the driving for lens focusing is halfway brought to a stop. However, it is also preferable to adopt another flow in which after a predetermined amount of driving for lens focusing has been performed, the process enters the photographic sequence.

In yet another form of flow, it may be determined on the basis of the result of the distance measuring operation whether the process is to be inhibited from entering the photographic sequence.

In Step S9, it is determined whether the shutter time determined in Step S4 corresponds to a high-speed range or a low-speed range. If the shutter time is shorter than a predetermined shutter time, a flag TvHi is set (S10), while if the shutter time is longer than the predetermined shutter time, a flag TvLo is set (S11).

In Step S12, a battery check is performed. If the battery voltage is higher than a predetermined voltage, a flag BCHi is set (S13). If the battery voltage is lower than the predetermined voltage, a flag BCLo is set (S14).

In Step S15, the mirror driving motor 108 is energized to start a mirror-up operation.

In Step S16, a lens-aperture reducing operation is started. To avoid simultaneous occurrence of rush currents, it is desirable to perform Step S16 slightly later than Step S15.

If the lens-aperture reducing operation is completed (S17) and the mirror-up operation is completed (S18), a shutter driving operation is performed (S19). The shutter driving operation will be described later in detail.

If the shutter driving operation is completed, a mirror-down operation is started (S20) and a lens-aperture opening operation is started (S21). If the lens aperture is fully opened (S22) and the mirror-down operation is completed (S23), a film winding operation is started (S24).

The reason why the film is transported before a shutter charging operation is as follows. In the first embodiment, since the leading-curtain arrangement and the trailing-curtain arrangement have the individual charging driving sources, the trailing curtain 4 might be charged earlier than the leading curtain 3 during a shutter charging operation. In this case, an exposed frame of the film will be re-exposed to damage the film. For the purpose of preventing such an accident, the film having the exposed frame is transported before the shutter charging operation, whereby the re-exposure of the exposed frame is prevented.

When the film winding operation is completed (S25), it is determined whether the flag BCHi or BCLo is set as a battery check flag (S26). If the flag BCHi is set as the battery check flag, the leading curtain 3 and the trailing curtain 4 are simultaneously charged to increase the frame speed. If the flag BCLo is set as the battery check flag, the leading curtain 3 and the trailing curtain 4 are charged in series so that the shutter can be charged even if the battery capacity is low. First of all, the case of the simultaneous charging will be described below.

In Step 27, the leading curtain driving USM 6 is driven to start charging the leading curtain driving spring 8. The process waits for 10 ms after the start of the driving of the leading curtain driving USM 6 (S28). Then, the trailing curtain driving USM 12 starts its driving operation to start charging the trailing curtain driving spring 13 (S29).

Such a 10-ms timer is provided for preventing erroneous exposure from being caused during charging by the trailing curtain 4 running ahead of the leading curtain 3. However, even if the 10-ms timer is provided, erroneous exposure might occur. For this reason, it is detected which of the trailing-curtain charging completion signal 15b (S30) or the leading-curtain charging completion signal 11b (S31) has come earlier, and if it is detected that the trailing-curtain charging completion signal 15b has come earlier, it is determined that the trailing curtain 4 has run ahead of the leading curtain 3 to cause erroneous exposure during the charging.

The case where the leading-curtain charging completion signal 11b has been detected earlier is described below. If the leading-curtain charging completion signal 11b is detected, the driving of the leading curtain driving USM 6 is brought to a stop (S32).

Then, if the trailing-curtain charging completion signal 15b is detected (S33), the driving of the trailing curtain driving USM 12 is brought to a stop (S34). Thus, one sequence of the camera comes to an end (S46).

If the trailing-curtain charging completion signal 15b is detected earlier than the leading-curtain charging completion signal 11b, it is determined that erroneous exposure has occurred (S30), and the driving of the trailing curtain driving USM 12 is brought to a stop. Then, if the leading-curtain charging completion signal 11b is detected (S36), the driving of the leading curtain driving USM 6 is brought to a stop (S37). Then, winding of the film having the erroneously exposed frame is started (S38), whereby the film is transported by one frame. By transporting the film, which has been erroneously exposed during the charging, by one more frame in this manner, it is possible to protect the next frame of the film to be exposed. When the film winding for one frame is completed (S39), one sequence of the camera comes to an end.

The case where it is determined in Step S26 that the flag BCLo is set as the battery check flag will be described below. In this case, since simultaneous driving of the leading curtain driving USM 6 and the trailing curtain driving USM 12 is impossible because the battery capacity is low, the leading curtain 3 and the trailing curtain 4 are charged in series.

In Step 40, the leading curtain driving USM 6 is driven to start charging the leading curtain driving spring 8. If the leading-curtain charging completion signal 11b is detected (S41), the driving of the leading curtain driving USM 6 is brought to a stop (S42). Then, the trailing curtain driving USM 12 is driven to start charging the trailing curtain driving spring 13 (S43). If the trailing-curtain charging completion signal 15b is detected (S44), the driving of the trailing curtain driving USM 12 is brought to a stop (S45). Thus, one sequence of the camera comes to an end (S46).

The shutter driving operation performed in Step S19 will be described below with reference to the flowchart shown in FIGS. 11(a) to 11(d).

First of all, it is determined whether a high-level flag (flag TvHi) or a low-level flag (flag TvLo) is set as a shutter time flag (T1). In the case of the Hi-level flag, the vibrator 6a of the leading curtain driving USM 6 is made to generate a standing wave of frequency $f_1$, whereby the holding torque of the leading curtain driving USM 6 is made approximately zero. Thus, the leading curtain 3 is made to run by the spring force of the leading curtain driving spring 8 which has already been charged (T2). At the same time, a shutter timer is started (T3). It is determined which is earlier, passage of the shutter time (T4) or detection of the leading-curtain brake signal 11c (T5). If the detection of the leading-curtain brake signal 11b is earlier, the vibrator 6a of the leading curtain driving USM 6 is made to generate a standing wave of frequency $f_2$. Thus, the resistance against which the leading curtain driving USM 6 is made to turn becomes larger and acts as a braking force to stop the running of the leading curtain 3 (T6). Then, it is determined which is earlier, passage of the shutter time (T7) or detection of the leading-curtain running completion signal 11d (T8). If the detection of the leading-curtain running completion signal 11d is earlier, the generation of the standing wave by the vibrator 6a of the leading curtain driving USM 6 is brought to a stop (T9). Thus, the holding torque is generated in the leading curtain driving USM 6 so that the bounding of the leading curtain 3 can be prevented.

The process waits until the shutter time elapses (T10). If the shutter time elapses, the vibrator 12a of the trailing curtain driving USM 12 is made to generate a standing wave of frequency $f_1$, whereby the holding torque of the trailing curtain driving USM 12 is made approximately zero. Thus, the trailing curtain 4 is made to run by the spring force of the trailing curtain driving spring 13 which has been charged (T11).

If the trailing-curtain brake signal 15c is detected (T12), the vibrator 12a of the trailing curtain driving USM 12 is made to generate a standing wave of frequency $f_2$. Then, the resistance of the trailing curtain driving USM 12 becomes larger and acts as a braking force to stop the running of the trailing curtain 4 (T13).

If the trailing-curtain running completion signal 15d is detected (T14), the generation of the standing wave by the vibrator 12a of the trailing curtain driving USM 12 is brought to a stop (T15). When the trailing curtain driving USM 12 is stopped, a holding force is generated in the trailing curtain driving USM 12, so that the bounding of the trailing curtain 4 can be prevented. Then, the process proceeds to Step S20 of FIG. 10(b).

The case where it is determined in Step T4 that the shutter time has elapsed will be described below.

In Step T16, the vibrator 12a of the trailing curtain driving USM 12 is made to generate a standing wave of frequency $f_1$, thereby causing the trailing curtain 4 to run by the spring force of the trailing curtain driving spring 13.

If the leading-curtain brake signal 11c is detected (T17), the vibrator 6a of the leading curtain driving USM 6 is made to generate a standing wave of frequency $f_2$, thereby braking the running of the leading curtain 3 (T18).

It is determined which is detected earlier, the leading-curtain running completion signal 11d (T19) or the trailing-curtain brake signal 15c (T20). If the trailing-curtain brake signal 15c is detected earlier, the vibrator 12a of the trailing curtain driving USM 12 is made to generate a standing wave of frequency $f_2$, thereby braking the running of the trailing curtain 4 (T21). If the leading-curtain running completion signal 11d is detected (T22), the generation of the standing wave by the vibrator 6a of the leading curtain driving USM 6 is brought to a stop (T23), whereby the running of the leading curtain 3 is brought to a stop by the holding torque.

If the trailing-curtain running completion signal 15d is detected in Step T24, the generation of the standing wave by the vibrator 12a of the trailing curtain driving USM 12 is brought to a stop (T25), whereby the running of the trailing curtain 4 is brought to a stop by the holding torque. Then, the process proceeds to Step 20 of FIG. 10(b).

If the leading-curtain running completion signal 11d is detected earlier in Step T19, the generation of the standing wave by the vibrator 6a of the leading curtain driving USM 6 is brought to a stop (T26).

If the trailing-curtain brake signal 15c is detected, the vibrator 12a of the trailing curtain driving USM 12 is made to generate a standing wave of frequency $f_2$ (T28), thereby braking the trailing curtain 4.

Then, if the trailing-curtain running completion signal 15d is detected (T29), the generation of the standing wave by the vibrator 12a of the trailing curtain driving USM 12 is brought to a stop (T30), whereby the running of the trailing curtain 4 is brought to a stop. Then, the process proceeds to Step 20 of FIG. 10(b).

If it is determined in Step T7 that the shutter time has elapsed, the vibrator 12a of the trailing curtain driving USM 12 is made to generate a standing wave of frequency $f_1$, thereby cancelling the holding force of the trailing curtain driving USM 12. Thus, the trailing curtain 4 is made to run by the spring force of the trailing curtain driving spring 13 (T46).

If the leading-curtain running completion signal 11d is detected (T47), the generation of the standing wave by the vibrator 6a of the leading curtain driving USM 6 is brought to a stop, thereby stopping the driving of the leading curtain 3 (T48).

If the trailing-curtain brake signal 15c is detected (T49), the vibrator 12a of the trailing curtain driving USM 12 is made to generate a standing wave of frequency $f_2$, thereby braking the trailing curtain 4 (T50).

If the trailing-curtain running completion signal 15d is detected (T51), the generation of the standing wave by the vibrator 12a of the trailing curtain driving USM 12 is brought to a stop, thereby stopping the running of the trailing curtain 4 (T52). Then, the process proceeds to Step S20 of FIG. 10(b).

If it is determined in Step T1 that the shutter time flag TV is at the low (Lo) level, this indicates that the shutter time corresponds to the low-speed range. In the low-speed range, it is possible to provide a sufficient accuracy of shutter speed even if a slow curtain speed is selected, and camera shakes tend to occur easily because of the low-speed range. It is desirable, therefore, that the curtain speed be reduced. For this reason, in the case of the low-speed range, the vibrator of the associated USM is made to generate from the beginning a standing wave, such as that of frequency $f_2$ shown in FIG. 6, which can provide a resistance which is large to some extent.

In Step T33, the vibrator 6a of the leading curtain driving USM 6 is made to generate a standing wave of frequency $f_2$. Thus, the holding torque of the leading curtain driving USM 6 decreases, and the leading curtain 3 starts running by the spring force of the leading curtain driving spring 8 which has already been charged. At the same time, the shutter timer is started (T34).

If the leading-curtain running completion signal 11d is detected (T35), the generation of the standing wave by the vibrator 6a of the leading curtain driving USM 6 is brought to a stop, thereby stopping the running of the leading curtain 3 (T36).

Then, the process waits until the shutter time elapses (T37), and the vibrator 12a of the trailing curtain driving USM 12 is made to generate a standing wave of frequency $f_2$, so that the holding torque of the trailing curtain driving USM 12 decreases and the trailing curtain 4 is made to run by the trailing curtain driving spring 13 which has already been charged (T38).

If the trailing-curtain running completion signal 15d is detected (T39), the generation of the standing wave by the vibrator 12a of the trailing curtain driving USM 12 is brought to a stop, thereby stopping the running of the trailing curtain 4 (T40).

In the above description, it is assumed that the leading curtain 3 and the trailing curtain 4 form no slit in the case of the low-speed range. However, it is possible to adopt an arrangement in which a slit is formed in the case of the low-speed range. The process then proceeds from Step T40 to Step 20 of FIG. 10(b).

<Second Embodiment>

A mirror driving mechanism which utilizes the present invention will be described below with reference to FIGS. 12 through 15.

Figure 12:
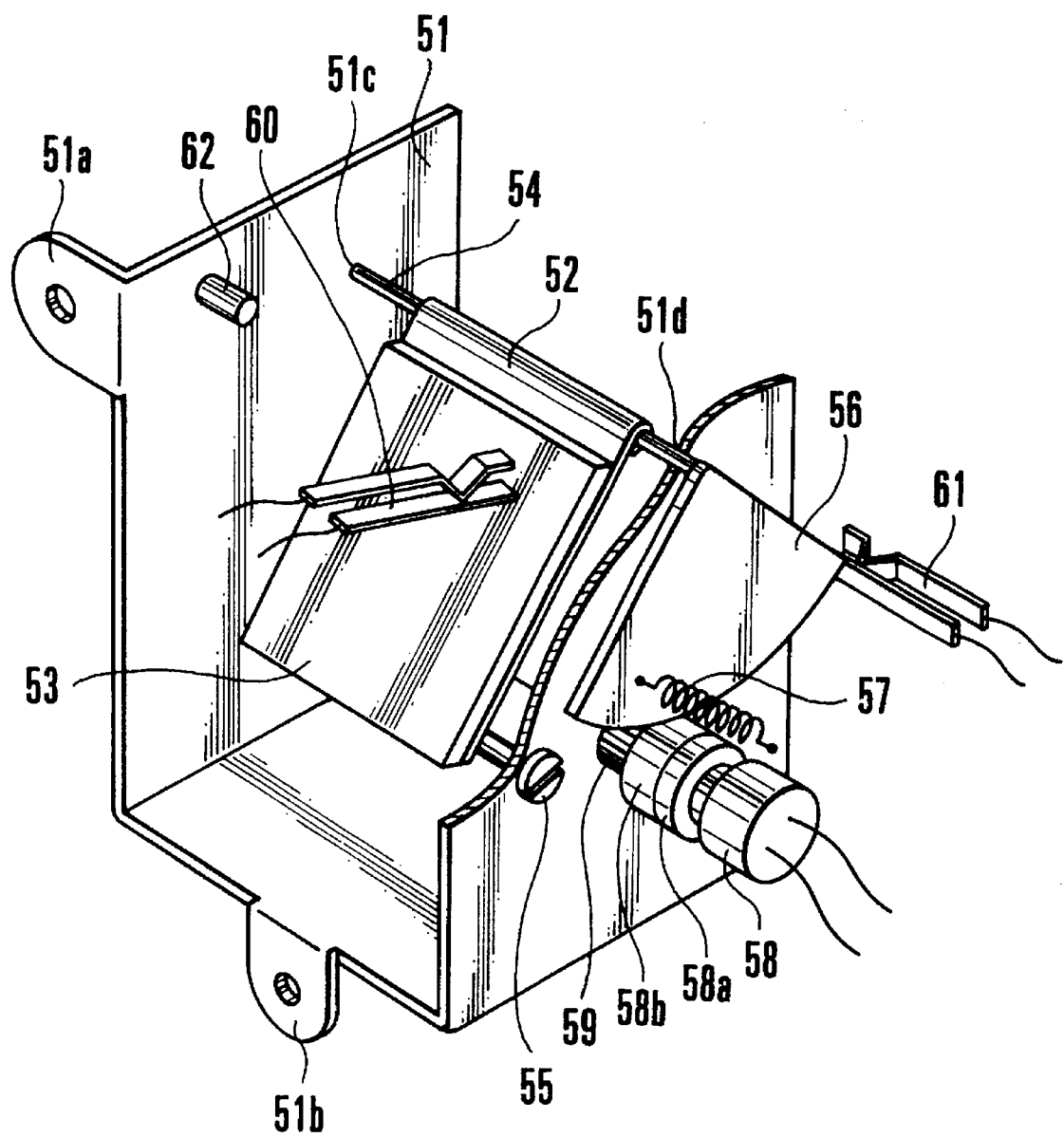
FIG. 12 is a diagrammatic perspective view showing the mirror-down state of a second embodiment of the present invention.

Referring to FIG. 12, a mirror box 51 is fixed to the camera body (not shown) by means of fixing portions 51a and 51b. A mirror 53 is fixed to a mirror holder 52, and a turning shaft 54 is fixed to one end of the mirror holder 52. The turning shaft 54 is rotatably supported by holes 51c and 51d which are respectively provided in the opposite side portions of the mirror box 51. An eccentric pin 55 adjustably projects from one side portion of the mirror box 51, and serves as a stopper which abuts on the mirror holder 52 to determine the angle of the mirror 53 at the down position thereof. A sector gear 56 is fixed to one end of the driving shaft 54 which projects from the one side portion of the mirror box 51, and a spring 57 is disposed between the sector gear 56 and the one side portion of the mirror box 51 so that the mirror 53 is urged in its downward direction at all times. A USM 58 includes a vibrator 58a and a rotor 58b and is supported on the camera body, and a gear 59 provided on the rotating shaft of the USM 58 is meshed with the sector gear 56. Position detecting switches 60 and 61 are arranged in the camera body in such a manner as to be respectively closed by the sector gear 56 at a position immediately before an upward-movement completion position and at a position immediately before a downward-movement completion position. A stopper pin 62 is provided on the inside surface of one side portion of the mirror box 51 in such a manner that it can abut against the mirror 53 when the mirror 53 is placed in its mirror-up state.

Figure 14:
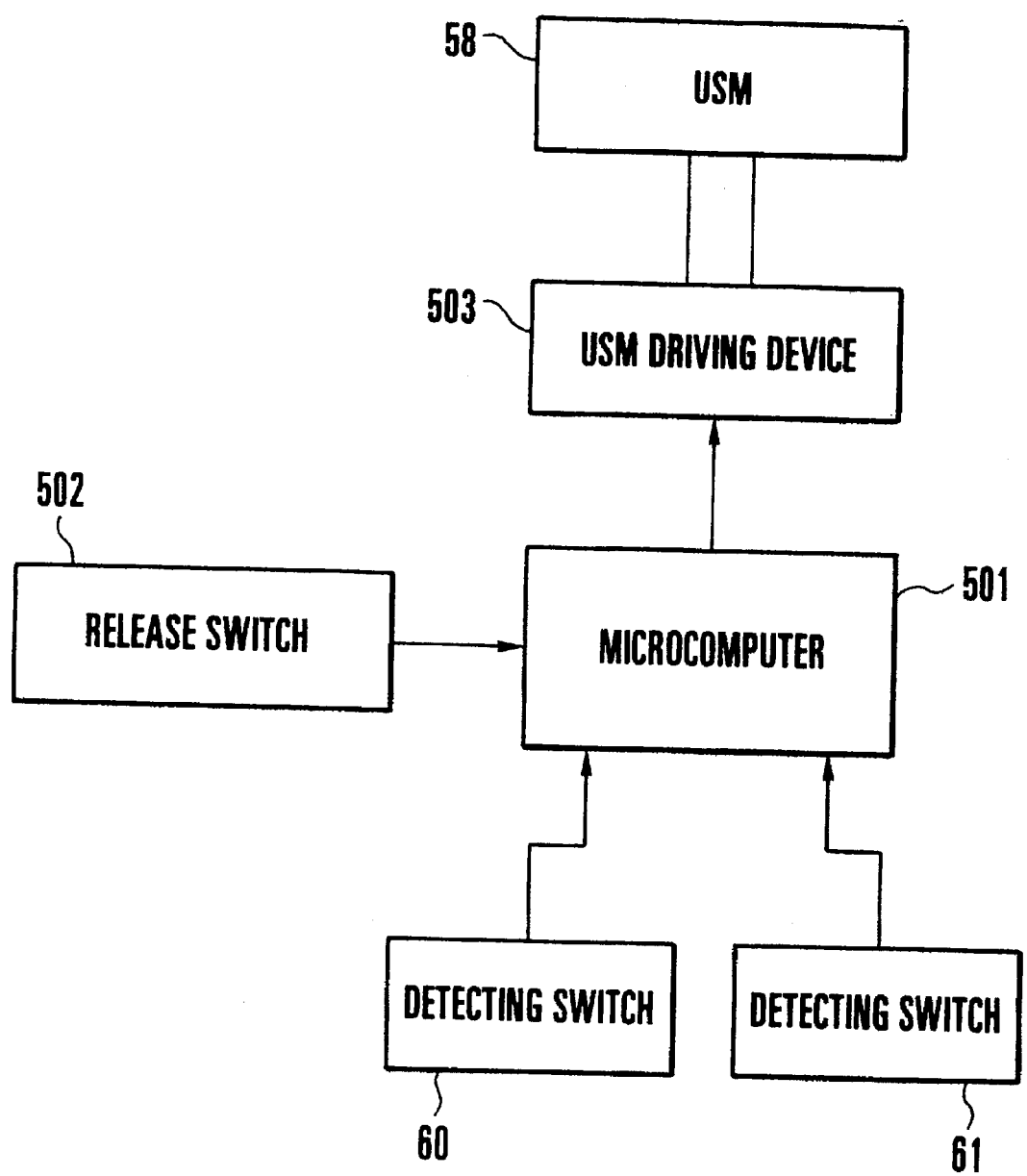
FIG. 14 is a block diagram showing the electrical arrangement of the second embodiment of the present invention.

FIG. 14 is a schematic block diagram showing the electrical arrangement of the second embodiment. A USM driving device 503 includes known constituent elements such as a D/A converter, a VCO, a phase shifter and an amplifier. Signals from a release switch 502 and the position detecting switches 60 and 61 are inputted into a microcomputer 501. The USM 58 is driven by the USM driving device 503 in accordance with a signal from the microcomputer 501.

The operation of the second embodiment having the above-described arrangement will be described below.

In the case of a subject-viewing state in which no shutter release has yet been performed, the mirror 53 is placed in its down position, as shown in FIG. 12, so that subject light which has entered the mirror box 51 is conducted toward a viewfinder optical system (not shown).

Figure 13:
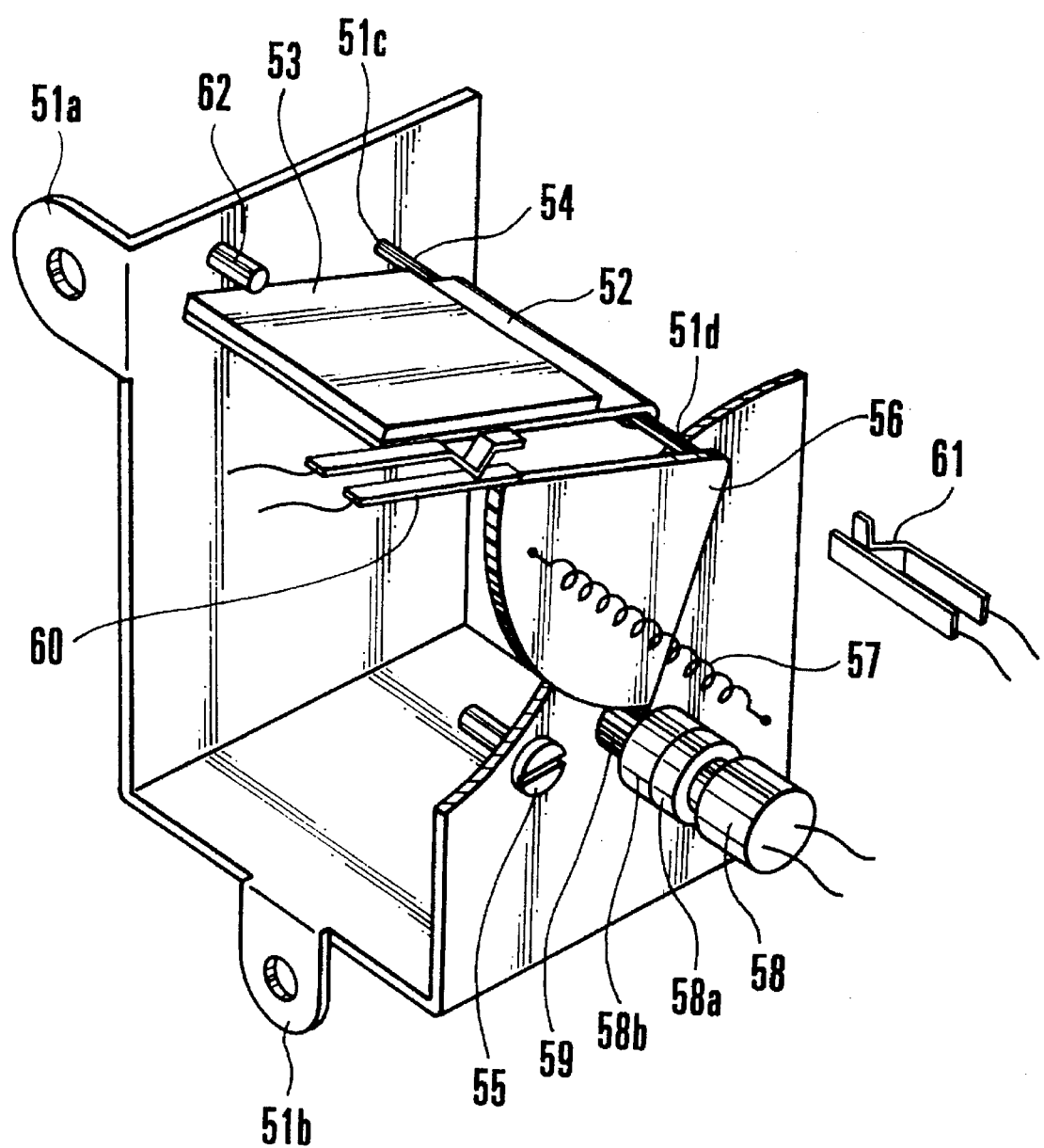
FIG. 13 is a diagrammatic perspective view showing the mirror-up state of the second embodiment of the present invention.

During photography, if the release switch 502 is turned on by a release operation, the USM driving device 503 receives a signal from the microcomputer 501 and causes the vibrator 58a of the USM 58 to generate a travelling wave, thereby rotating the USM 58 in the counterclockwise direction in order to move up the mirror 53. Thus, the sector gear 56 moves up the mirror 53 via the gear 59 against the urging force of the spring 57. As shown in FIG. 13, when the mirror 53 moves up to a position immediately before the upward-movement completion position, the position detecting switch 60 is closed by the sector gear 56.

The USM 58 is driven until a predetermined time elapses after the position detecting switch 60 has been closed. This operation serves as a timer for ensuring that the mirror 53 is placed in its completely up state by abutment with the stopper pin 62. When the predetermined time elapses, the driving of the USM 58 is brought to a stop.

Since the holding torque of the USM 58 is larger than the force of the spring 57 which acts to move down the mirror 53, the mirror 53 is held in the mirror-up state until one photographic cycle comes to an end.

If the photographic cycle comes to an end, the USM driving device 503 receives a signal from the microcomputer 501 and causes the vibrator 58a of the USM 58 to generate a standing wave of frequency $f_1$ slightly higher than the resonance frequency $f_n$ such as that shown in FIG. 6, thereby reducing the holding torque to approximately zero. Thus, the spring force of the spring 57 becomes larger than the holding torque, so that the mirror 53 starts moving downward.

When the position detecting switch 61 is closed by the sector gear 56 immediately before the mirror-down operation is completed, the USM driving device 503 receives a signal from the microcomputer 501 and causes the vibrator 58a of the USM 58 to generate a standing wave of frequency which provides a high resistance, such as the frequency $f_2$ shown in FIG. 6. Thus, a brake effect is produced to reduce a shock which occurs when the mirror 53 reaches its mirror-down position.

The vibrator 58a is made to generate the standing wave of frequency $f_2$ until a predetermined time elapses after the position detecting switch 61 has been turned on. This operation serves as a timer for ensuring that the mirror 53 is placed in its completely down state. When the predetermined time elapses, the generation of the standing wave by the USM 58 is brought to a stop in accordance with a signal from the microcomputer 501.

Figure 15:
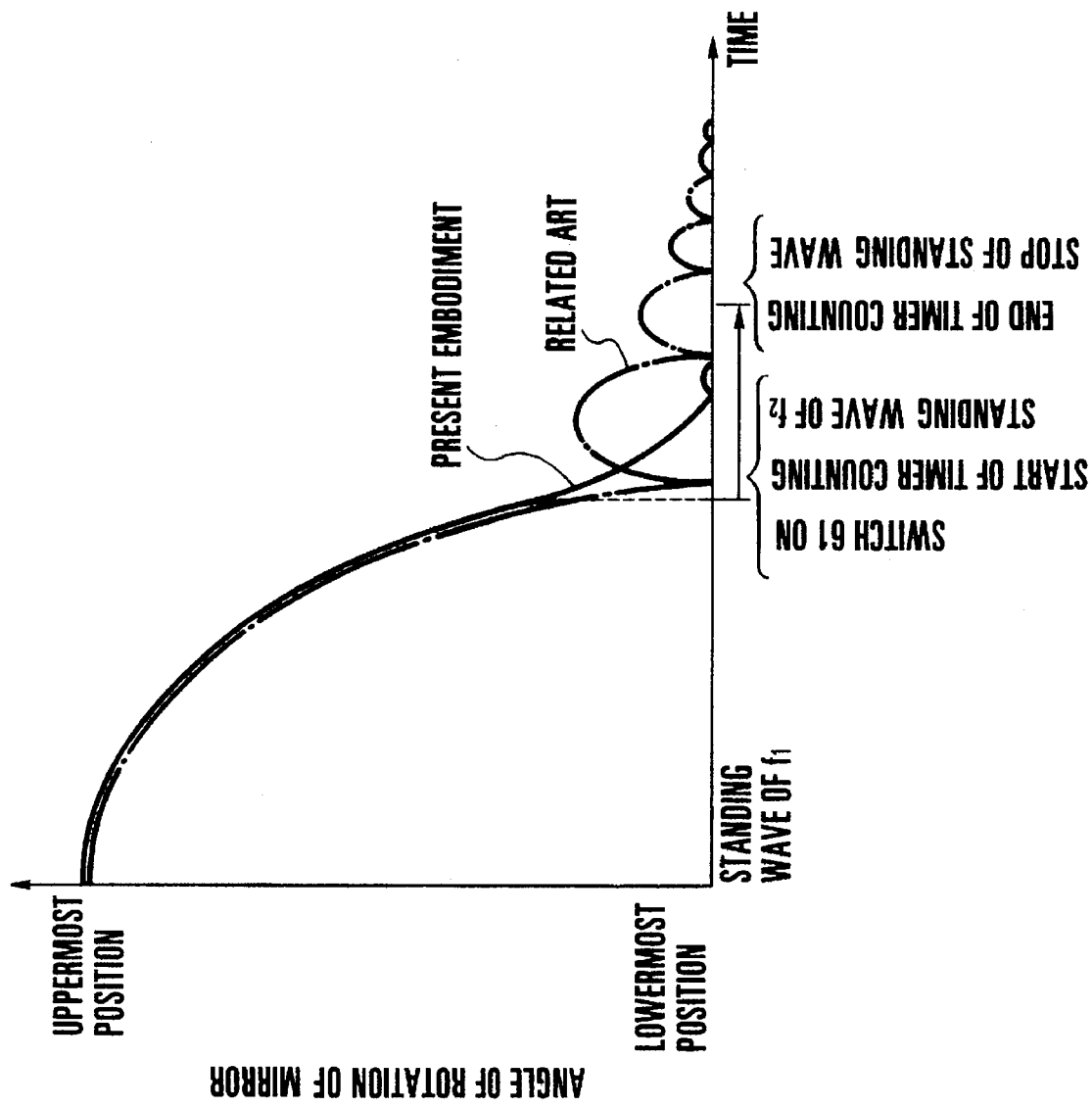
FIG. 15 is a graphic representation showing the mirror-down operation of the second embodiment of the present invention.
Figure 16:
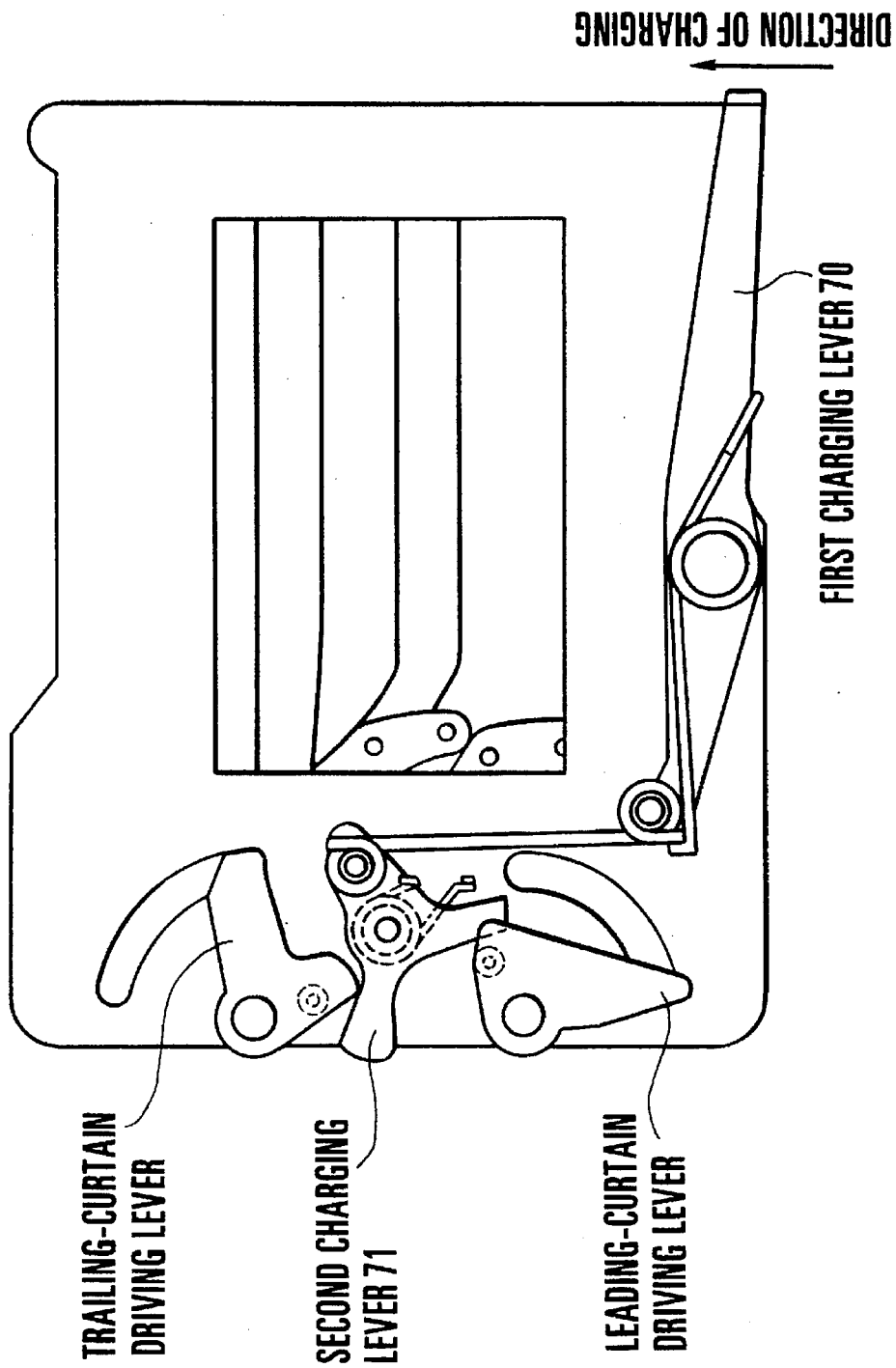
FIG. 16 is a diagrammatic front elevational view of a conventional focal plane shutter.

FIG. 15 is a graphic representation of the downward movement of the mirror 53 in the second embodiment. Conventional arrangements have the problem that since the mirror 53 bounds by striking a stopper (not shown) at high speeds, the mirror 53 is difficult to stably stop and a large impact noise occurs. However, according to the second embodiment, no substantial bounding occurs and the impact noise is reduced.

Although the first and second embodiments have been described with reference to the focal plane shutter and the mirror driving mechanism, respectively, the present invention is applicable to any driving mechanism, particularly, a reciprocal driving mechanism.

<Third Embodiment>

Figure 17:
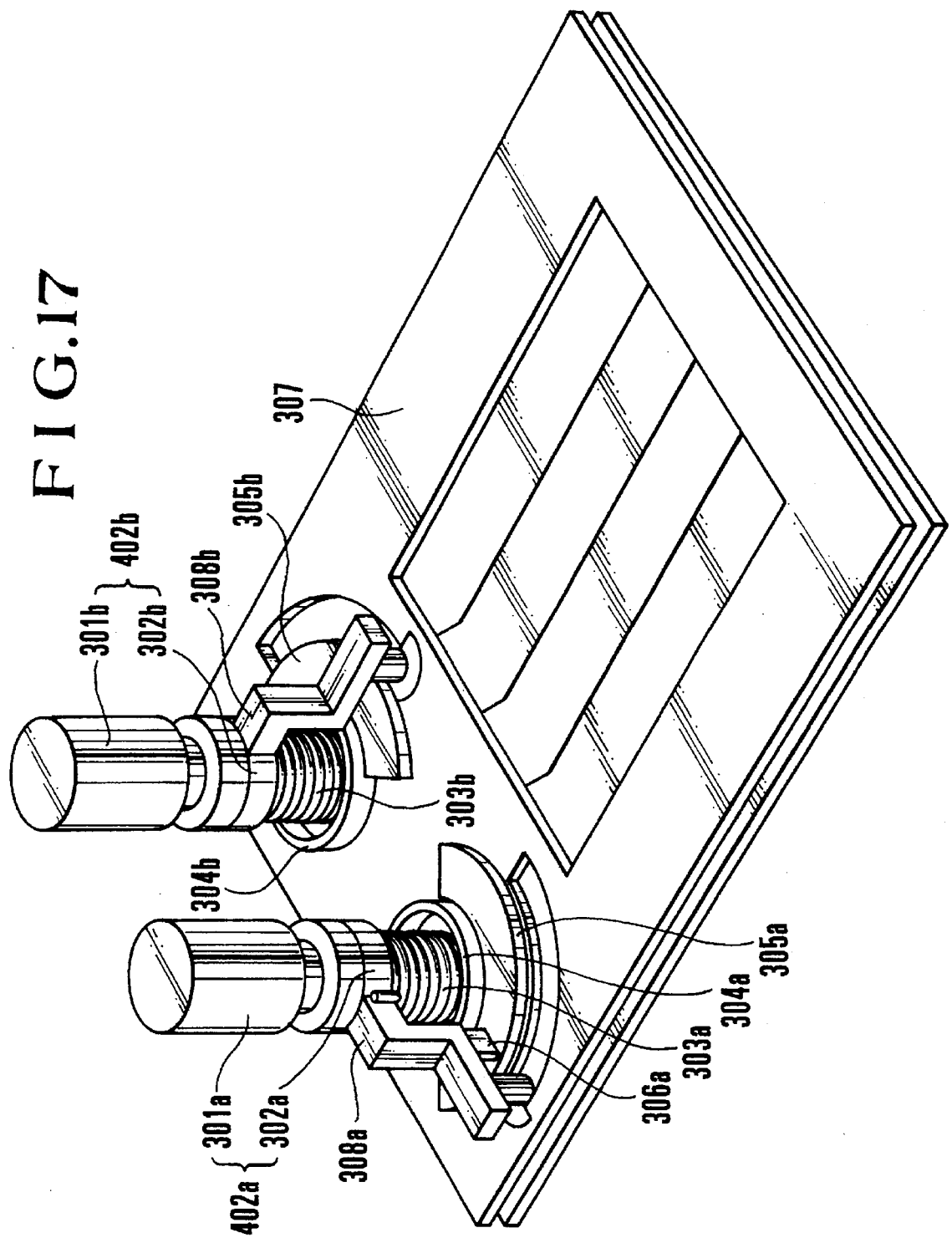
FIG. 17 is a diagrammatic perspective view showing the essential portions of the mechanical structure of a shutter system according to a third embodiment of the present invention.
Figure 18:
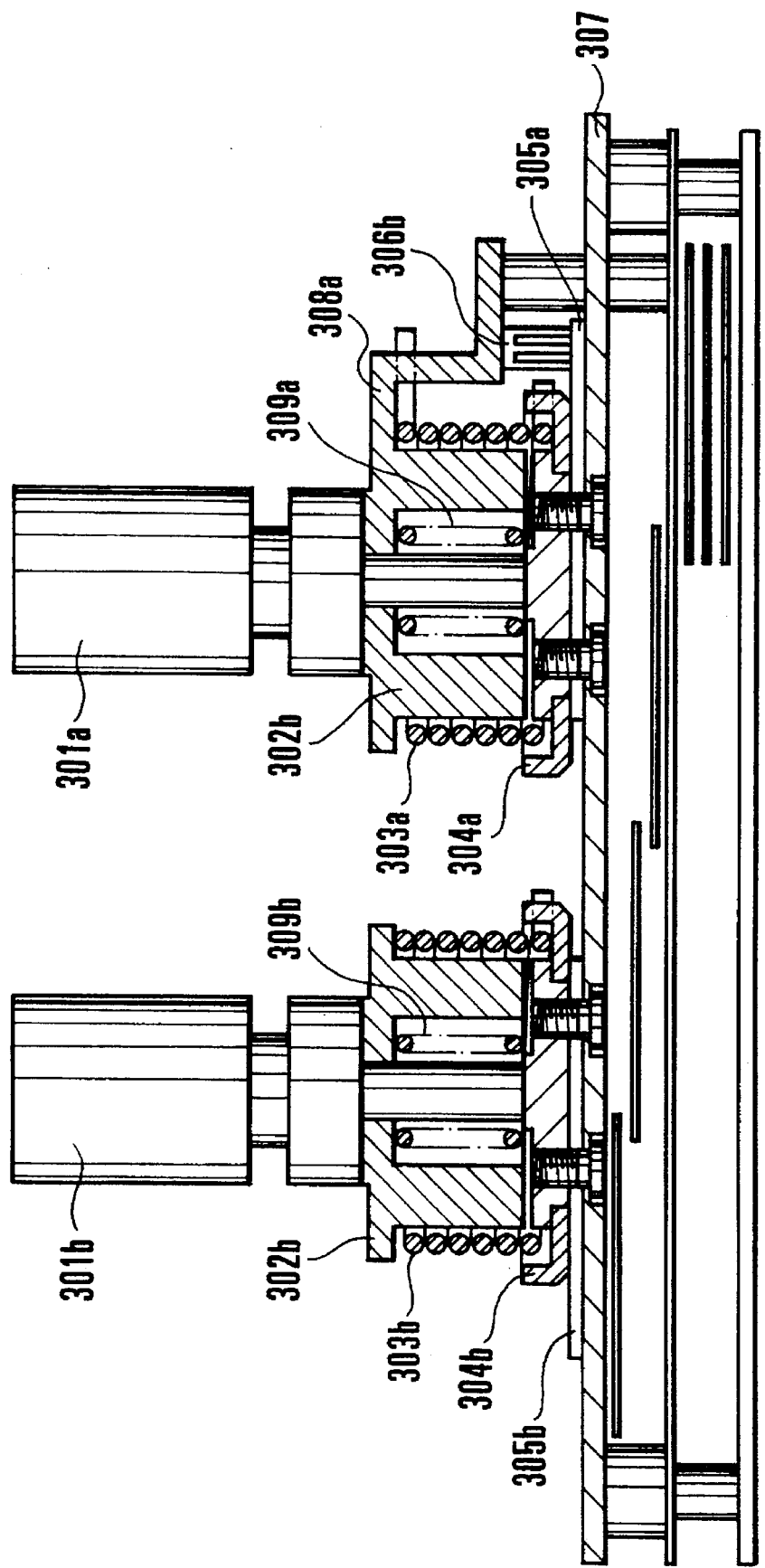
FIG. 18 is a diagrammatic cross-sectional view showing the essential portions of the mechanical structure of the shutter system according to the third embodiment of the present invention.

A third embodiment of the present invention will be described below with reference to FIGS. 17 through 27. FIGS. 17 and 18 are respectively a perspective view and a side elevational view showing the essential portions of the mechanical structure of a shutter system according to the third embodiment of the present invention.

The shutter system shown in FIGS. 17 and 18 includes a leading-curtain arrangement and a trailing-curtain arrangement as well as a shutter base plate 307. The leading-curtain arrangement includes an ultrasonic motor 402a having a stator 301a and a rotor 302a integral with a driving lever 308a for driving a shutter leading curtain, a spring 303a fixed at one end to the rotor 302a of the ultrasonic motor 402a for applying a driving force to the shutter leading curtain, a ratchet 304a connected to the spring 303a for adjusting the driving force to be applied to the shutter leading curtain, a signal pattern plate 305a on which a controlling signal pattern is formed for detecting the position of the shutter leading curtain, a slide contact 306a for detecting a position signal by moving in sliding contact with the signal pattern plate 305a, and a spring 309a for pressing the rotor 302a against the stator 301a of the ultrasonic motor 402a. The trailing-curtain arrangement similarly includes an ultrasonic motor 402b having a stator 301b and a rotor 302b integral with a driving lever 308b for driving a shutter trailing curtain, a spring 303b fixed at one end to the rotor 302b of the ultrasonic motor 402b for applying a driving force to the shutter trailing curtain, a ratchet 304b connected to the spring 303b for adjusting the driving force to be applied to the shutter trailing curtain, a signal pattern plate 305b on which a controlling signal pattern is formed for detecting the position of the shutter trailing curtain, a slide contact 306b for detecting a position signal by moving in sliding contact with the signal pattern plate 305b, and a spring 309b for pressing the rotor 302b against the stator 301b of the ultrasonic motor 402b. The stators 301a and 301b of the ultrasonic motors 402a and 402b are respectively fixed to the shutter base plate 307 via structure members (not shown). The rotors 302a and 302b integral with the driving lever 308a and 308b are relatively rotatably pressed against the stator 301a and 301b of the ultrasonic motors 402a and 402b by the springs 309a and 309b, respectively. The springs 303a and 303b for applying driving forces to the shutter leading curtain and the shutter trailing curtain are respectively disposed concentrically to the ultrasonic motors 402a and 402b. The spring 303a is fixed to the rotor 302a at one end and to the ratchet 304a at the other end, while the spring 303b is fixed to the rotor 302b at one end and to the ratchet 304b at the other end. The contacts 306a and 306b which move in sliding contact with the associated controlling signal patterns provided on the signal pattern plates 305a and 305b are respectively fixed to the driving levers 308a and 308b integral with the rotors 302a and 302b.

Figure 19:
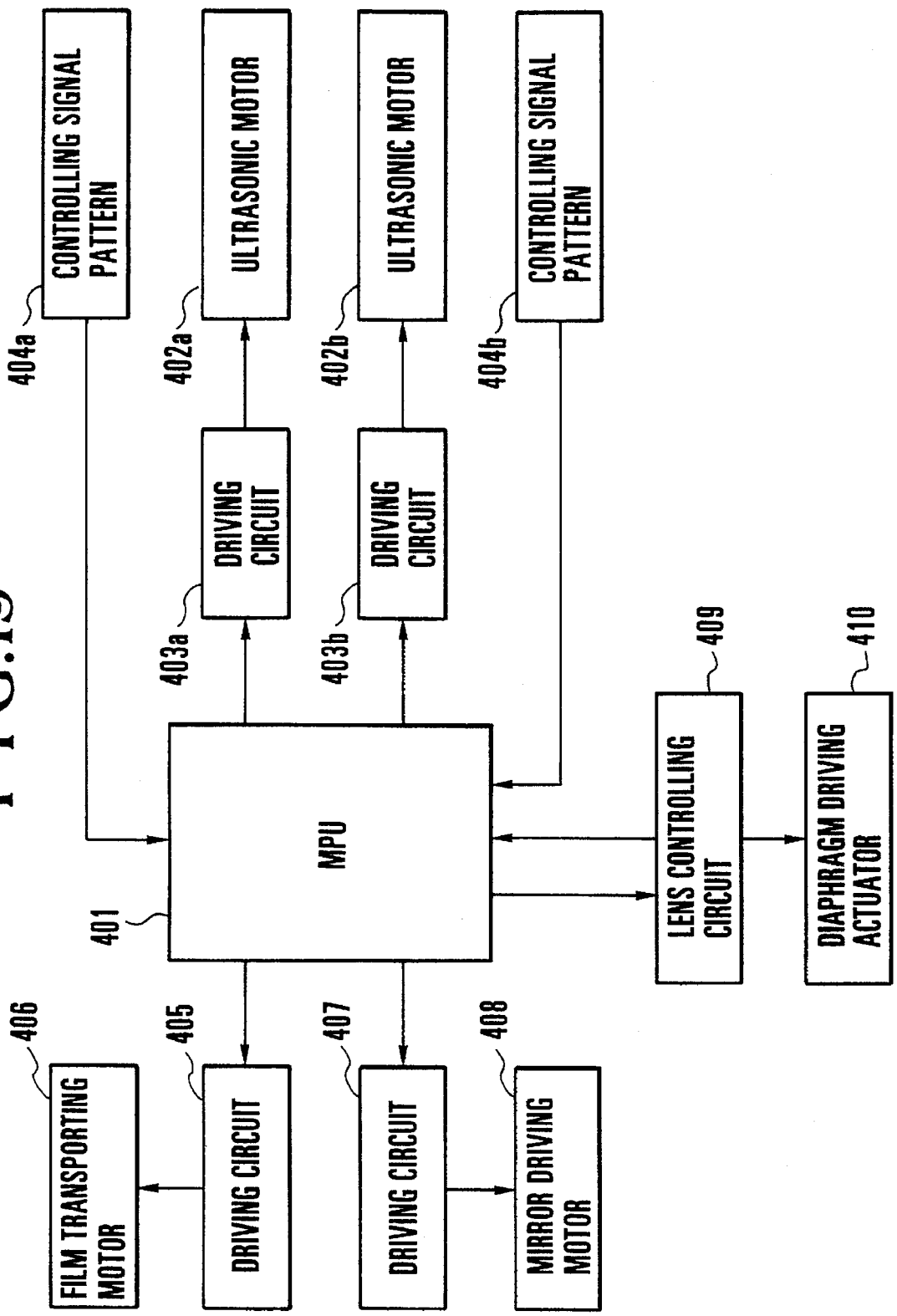
FIG. 19 is a block diagram of the electrical arrangement of a single-lens reflex camera provided with the shutter system according to the third embodiment of the present invention.

FIG. 19 is a block diagram showing the electrical arrangement of a single-lens reflex camera including a control circuit which is an electrical constituent element of the shutter system according to the third embodiment of the present invention. The electrical arrangement shown in FIG. 19 includes a MPU (microcomputer) 401 which serves as a central unit for controlling the camera, the ultrasonic motors 402a and 402b, driving circuits 403a and 403b for driving the associated ultrasonic motors 402a and 402b in accordance with signals from the microcomputer 401, position detecting and controlling signal patterns 404a and 404b formed on the respective signal pattern plates 305a and 305b, a driving circuit 405 for driving a film transporting motor 406, a driving circuit 407 for driving a mirror driving motor 408, the driving motor 408 for performing mirror driving, a lens controlling circuit 409 for controlling a lens (not shown), and a diaphragm driving actuator 410 for driving a diaphragm (not shown). In the above-described arrangement, the MPU 401 detect signals from the controlling signal patterns 404a and 404b in response to a shutter release signal. On the basis of the obtained information, the MPU 401 drives the ultrasonic motor 402a via the driving circuit 403a, the ultrasonic motor 402b via the driving circuit 403b, the film transporting motor 406 via the driving circuit 405, and the mirror driving motor 408 via the driving circuit 407. Also, the MPU 401 communicates with the lens controlling circuit 409 to drive the diaphragm driving actuator 410 via the lens controlling circuit 409.

Figure 20:
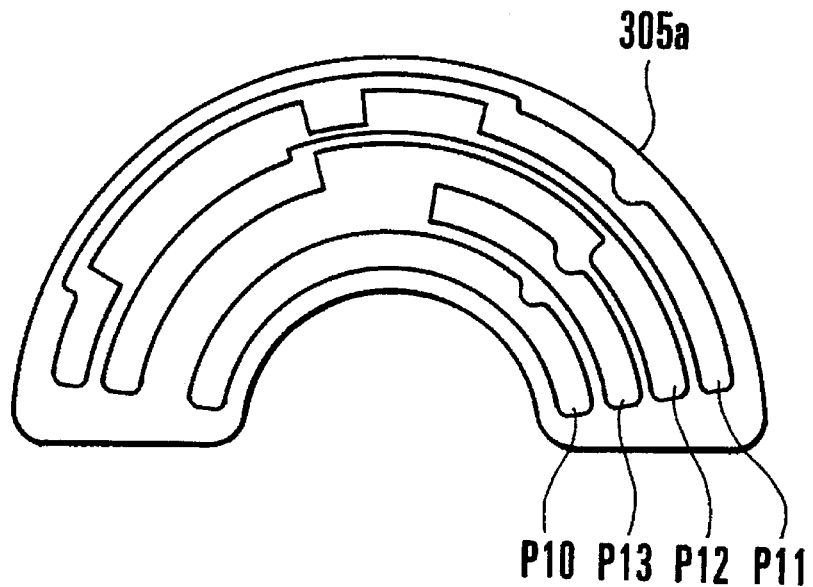
FIG. 20 is a diagrammatic plan view of a signal pattern plate which constitutes part of position detection means provided in the shutter system according to the third embodiment of the present invention.
Figure 21:
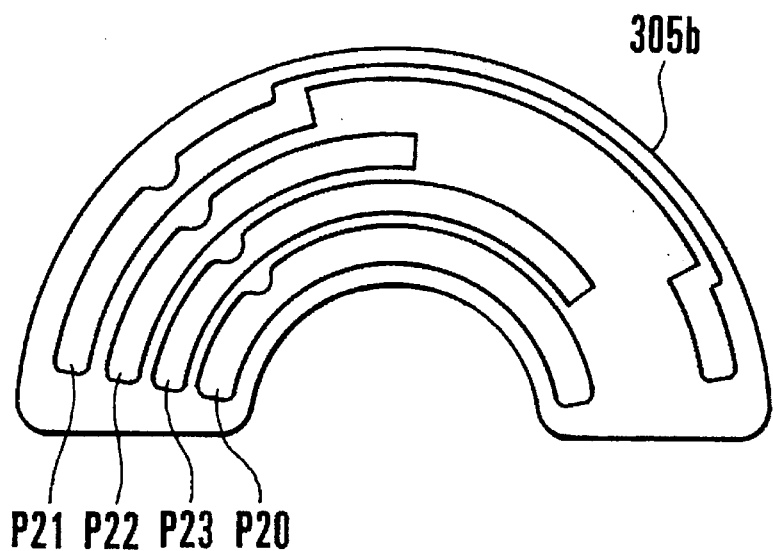
FIG. 21 is a diagrammatic plan view of another signal pattern plate which constitutes part of position detection means provided in the shutter system according to the third embodiment of the present invention.

FIGS. 20 and 21 respectively show specific examples of the position detecting and controlling signal pattern plates used in the shutter system according to the third embodiment of the present invention. FIG. 20 shows a signal pattern plate for controlling the leading curtain, and four conductor patterns P10, P11, P12 and P13 are formed on the signal pattern plate 305a.

The conductor pattern P10 is connected to ground. The conductor pattern P11 is a conductor pattern which indicates several positions of the leading curtain, specifically, a running completion position and a running readiness position as well as a panorama running braking position and a panorama running completion position. The conductor pattern P12 is a conductor pattern which indicates the panorama running braking position of the leading curtain, and the conductor pattern P13 is a conductor pattern which indicates a running braking position of the leading curtain.

FIG. 21 shows a signal pattern plate for controlling the trailing curtain, and four conductor patterns P20, P21, P22 and P23 are formed on the signal pattern plate 305b.

The conductor pattern P20 is connected to ground. The conductor pattern P21 is a conductor pattern which indicates a running completion position and a running readiness position of the trailing curtain. The conductor pattern P22 is a conductor pattern which indicates a panorama running readiness position of the trailing curtain, and the conductor pattern P23 is a conductor pattern which indicates a running braking position of the trailing curtain.

In the third embodiment, the slide contact 306a of FIG. 17 comes into sliding contact with the conductor patterns P11, P12 and P13 to generate a leading curtain's running braking position detection signal or a leading curtain's panorama running braking position detection signal, while the slide contact 306b comes into sliding contact with the conductor pattern P23 to generate a trailing curtain's running braking position detection signal.

Figure 22:
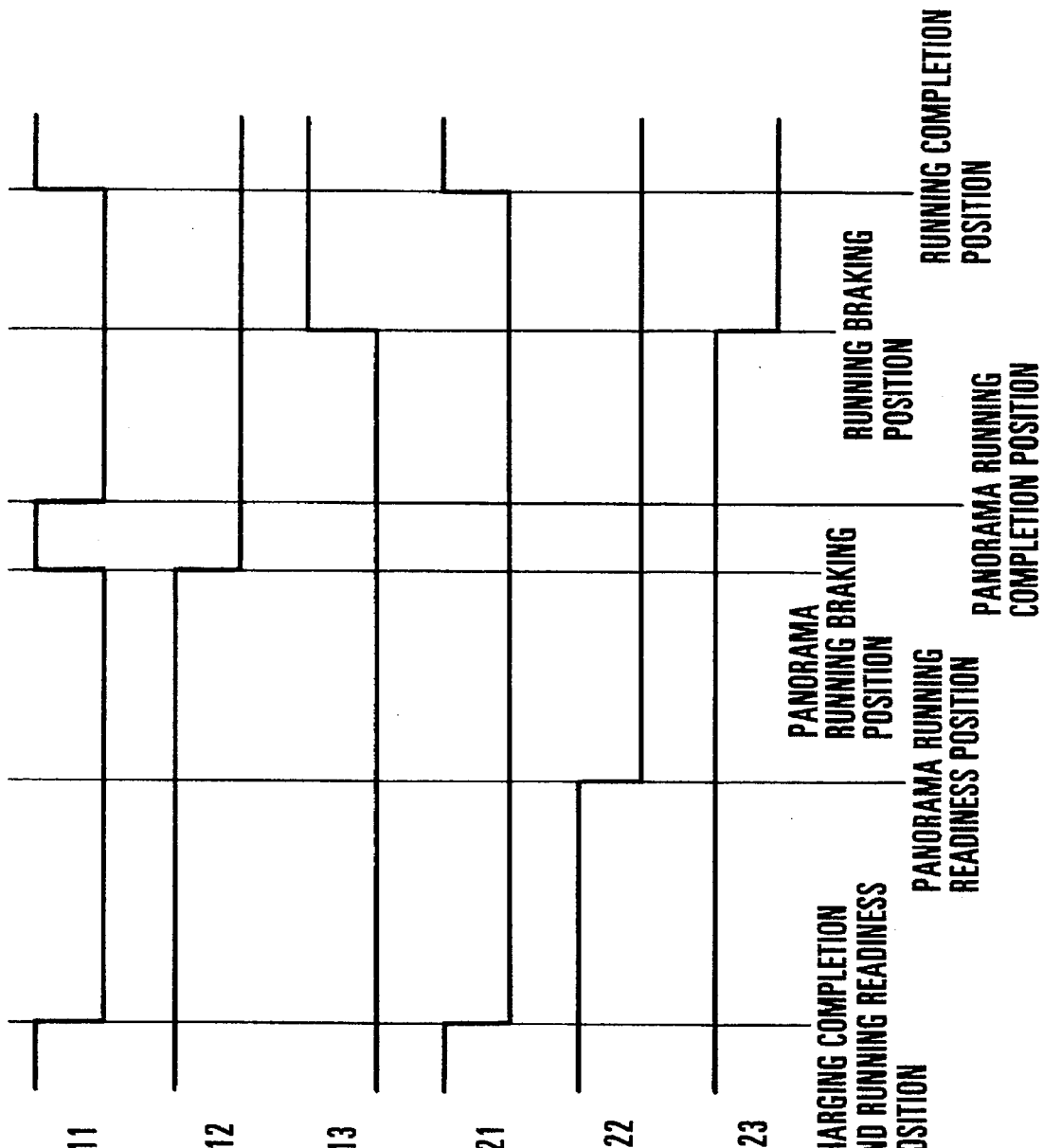
FIG. 22 is a view showing signals generated by the position detecting means having the signal pattern plates shown in FIGS. 19 and 20.

FIG. 22 is a view showing signals which are inputted into the MPU 401 by the slide contacts 306a and 306b respectively moving in sliding contact with the conductor patterns P11 to P13 formed on the signal pattern plate 305a and the conductor patterns P21 to P23 formed on the signal pattern plate 305b. The signal P11 indicates several positions of the leading curtain, specifically, the running completion position, the running readiness position, the panorama running braking position and the panorama running completion position. The signal P12 indicates the panorama running braking position of the leading curtain. The signal P13 indicates the running braking position of the leading curtain. The Signal P21 indicates the running completion position and the running readiness position of the trailing curtain. The signal P22 indicates the panorama running readiness position of the trailing curtain. The signal P23 indicates the panorama running braking position of the trailing curtain.

Figure 23:
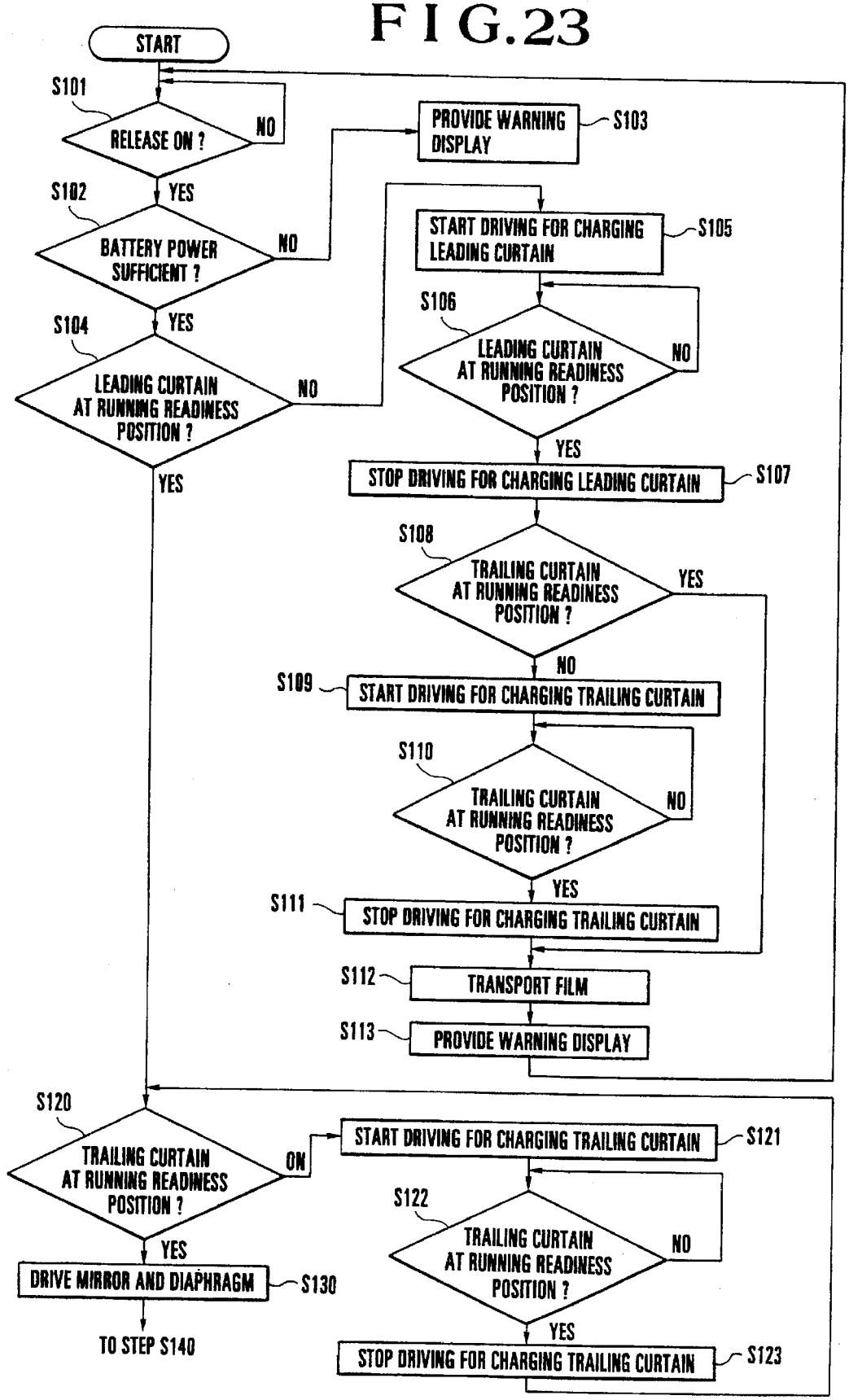
FIG. 23 shows part of a flowchart of the shutter controlling operation performed in the single-lens reflex camera provided with the shutter system according to the third embodiment of the present invention.
Figure 24:
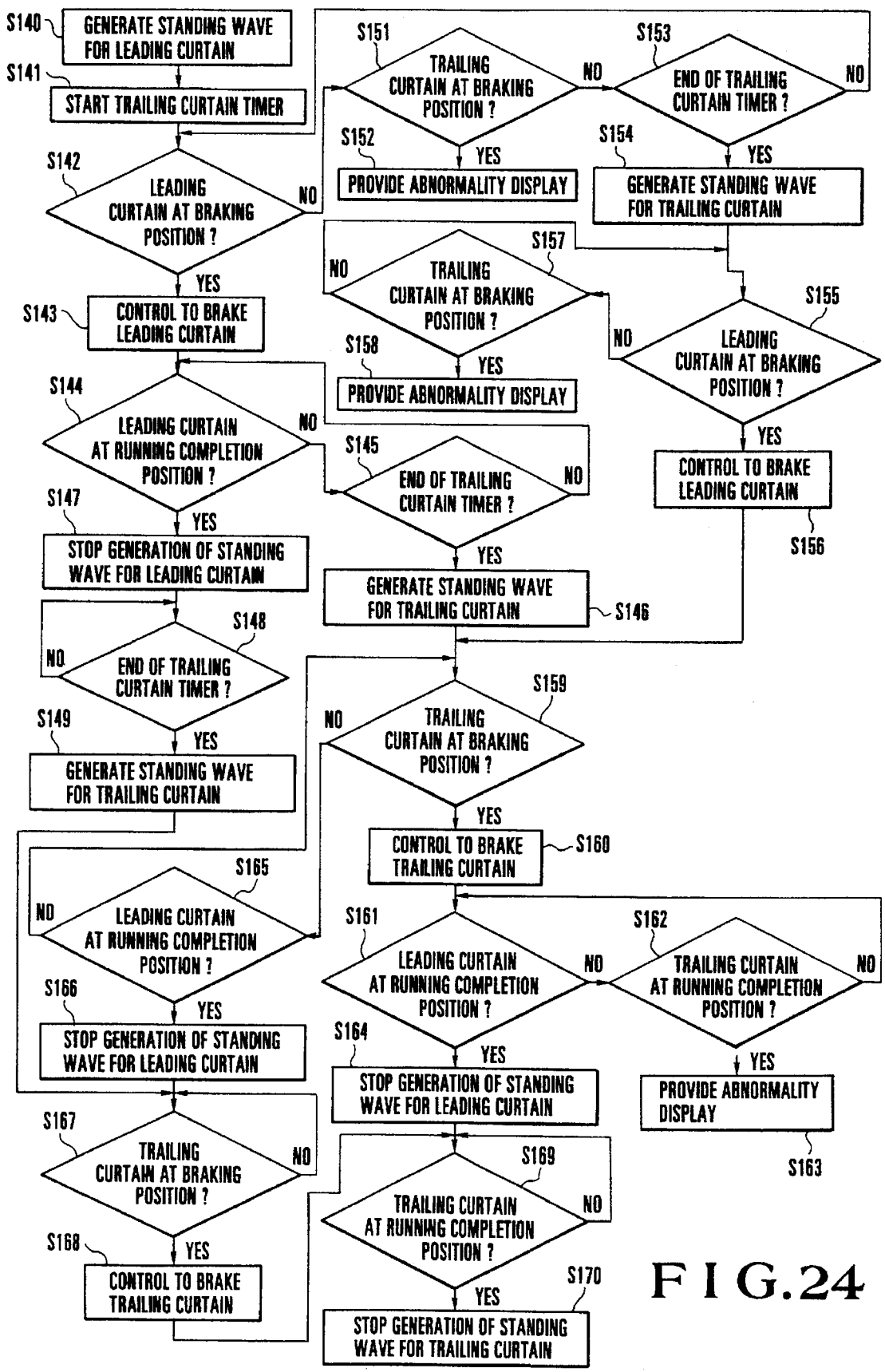
FIG. 24 shows part of the flowchart of the shutter controlling operation performed in the single-lens reflex camera provided with the shutter system according to the third embodiment of the present invention.
Figure 25:
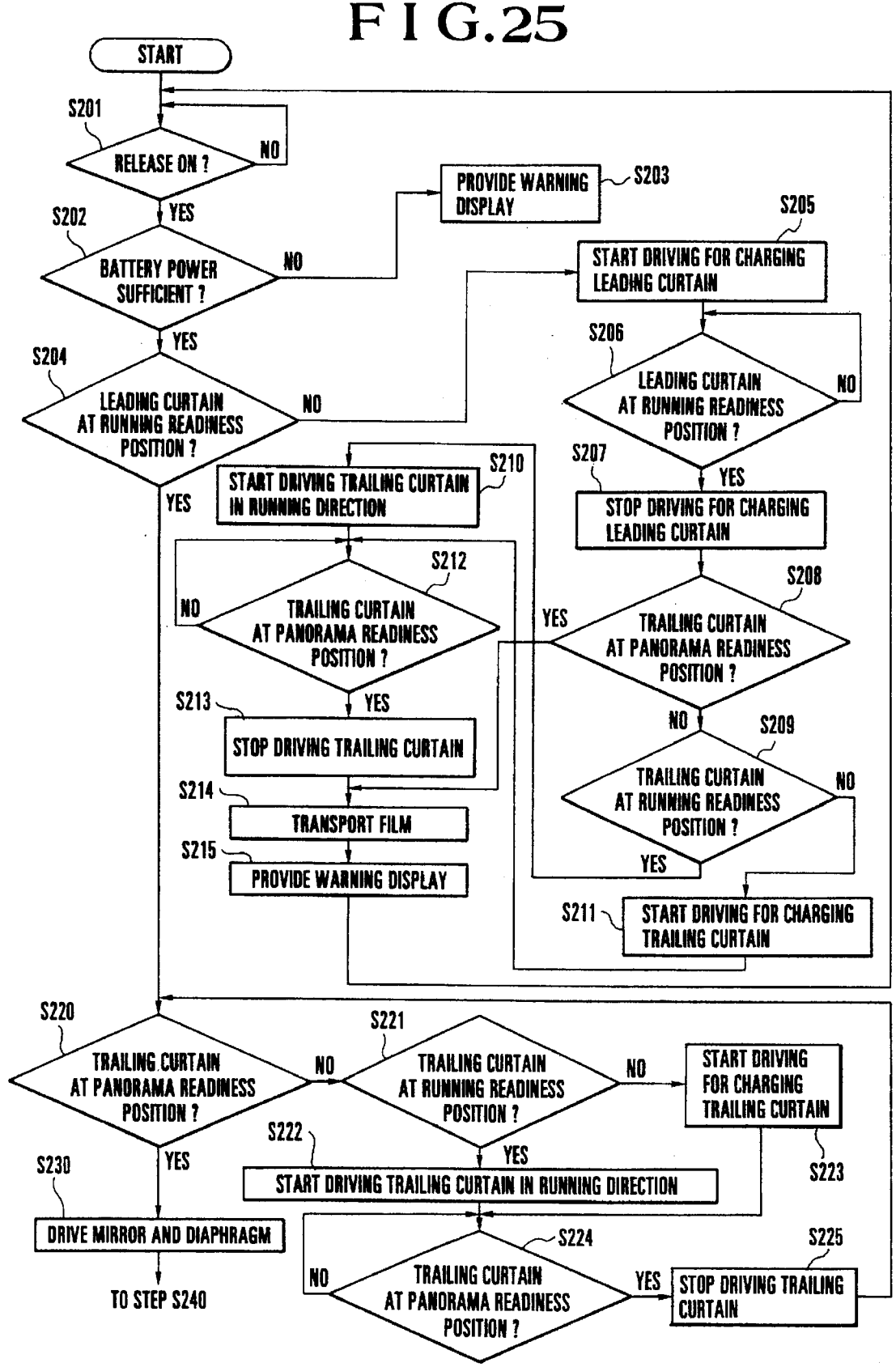
FIG. 25 shows part of the flowchart of the shutter controlling operation performed in the single-lens reflex camera provided with the shutter system according to the third embodiment of the present invention.
Figure 26:
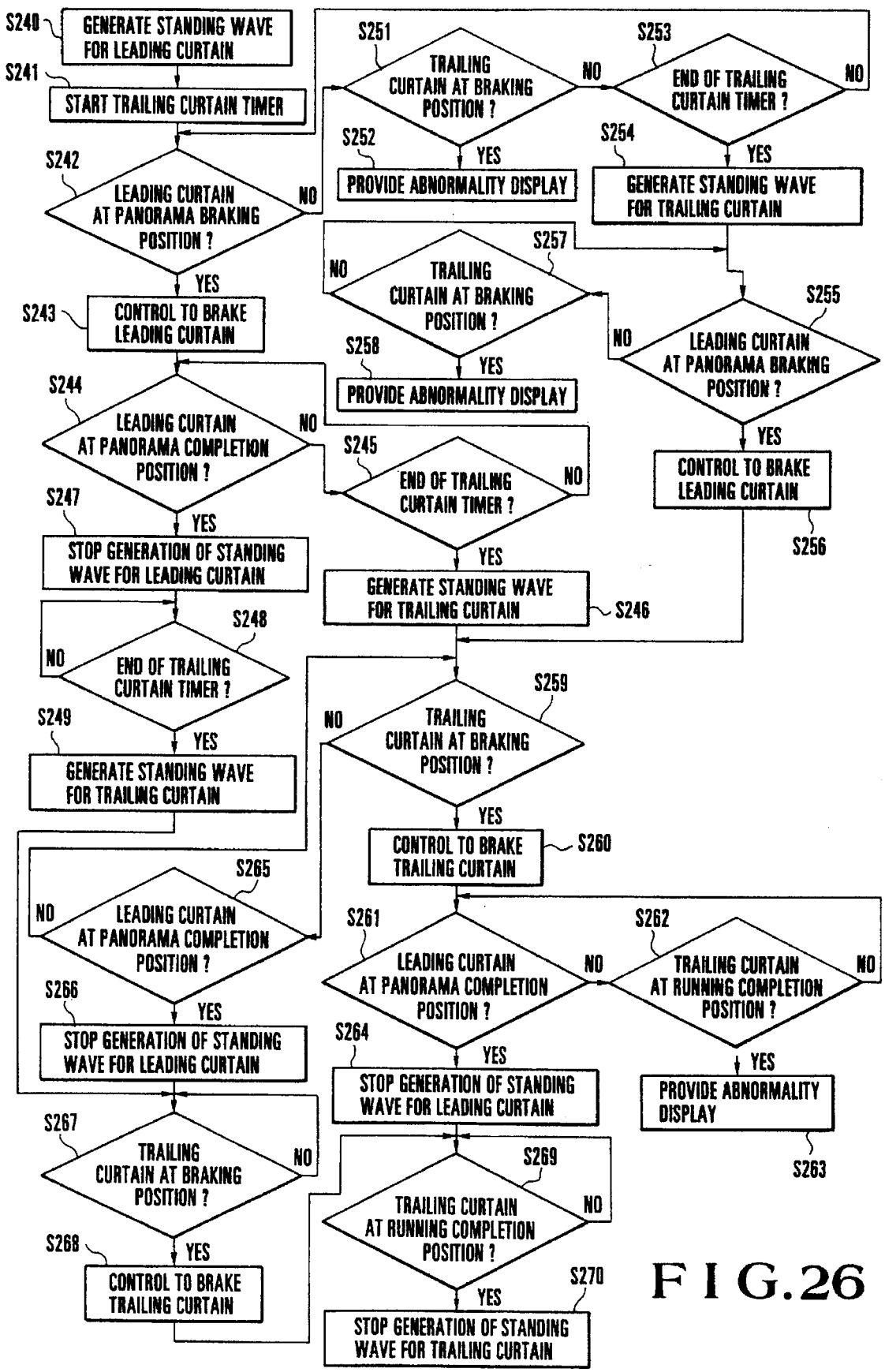
FIG. 26 shows part of the flowchart of the shutter controlling operation performed in the single-lens reflex camera provided with the shutter system according to the third embodiment of the present invention.
Figure 27:
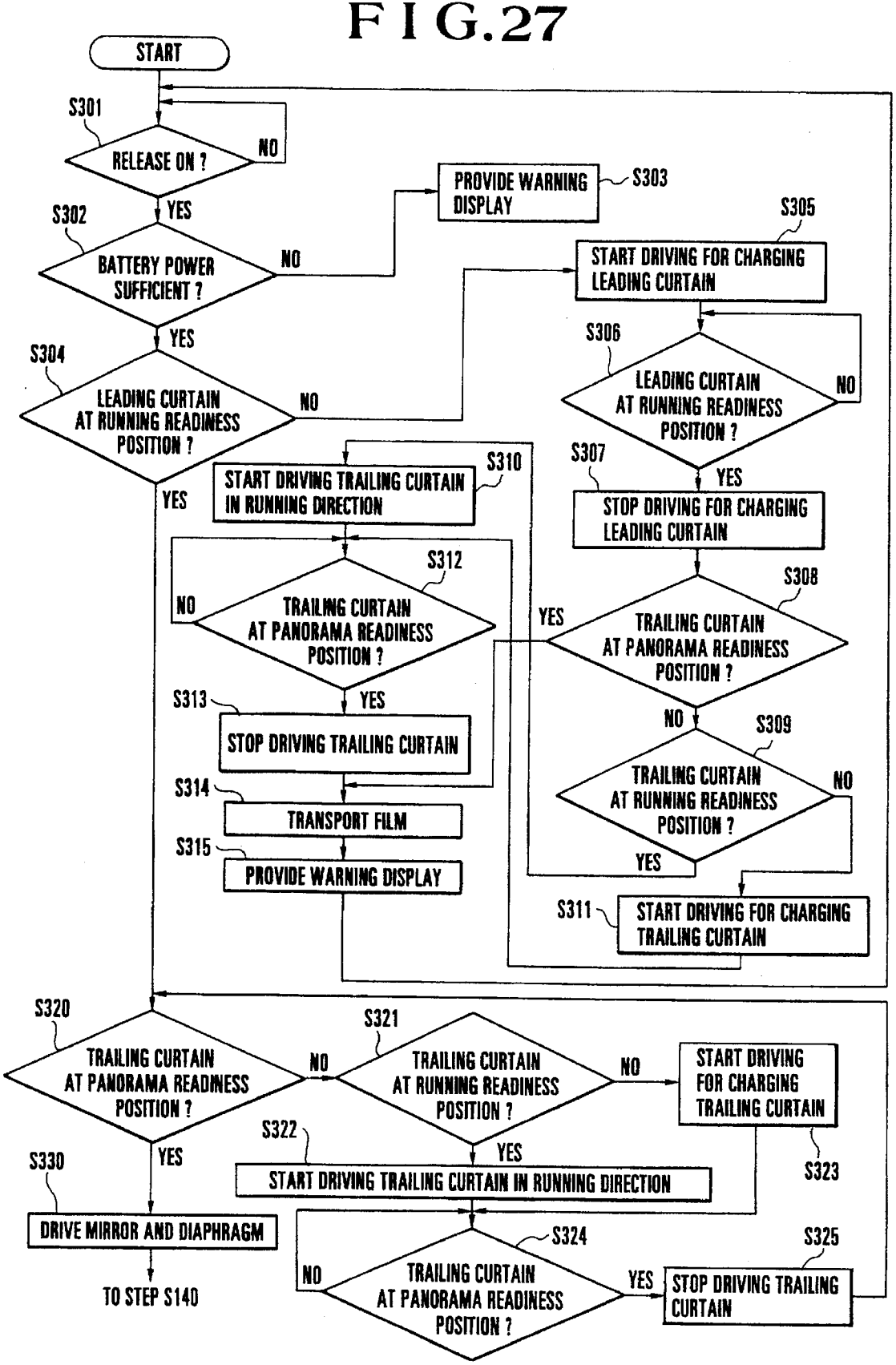
FIG. 27 shows part of the flowchart of the shutter controlling operation performed in the single-lens reflex camera provided with the shutter system according to the third embodiment of the present invention.

FIGS. 23, 24, 25, 26 and 27 are flowcharts showing the operation of the MPU 401 during the use of the camera having the shutter system according to the third embodiment of the present invention. A plurality of running modes are prepared for the shutter curtains of the shutter system according to the third embodiment. FIGS. 23 and 24 show a standard mode, FIGS. 25 and 26 show a panorama mode, and FIGS. 27 and 24 show a mask mode.

If a selected shutter running mode is the standard mode, the flowchart of FIG. 23 is selected. If it is determined in Step S101 that a shutter release operation has been performed, a battery check is performed (S102). If the battery capacity is insufficient, a warning indicating that the battery capacity is insufficient is displayed (S103). If the battery capacity is sufficient, detection of the position in which the leading curtain is present is performed (S104). If the leading curtain is not present at the running readiness position, the ultrasonic motor 402a is made to generate a travelling wave, thereby starting driving for charging the leading curtain (S105), and detection of the position of the leading curtain is performed while performing the driving for charging the leading curtain (S106). If it is detected that the leading curtain has reached the running readiness position, the ultrasonic motor 402a is brought to a stop, thereby stopping the driving for charging the leading curtain (S107). It is detected whether the trailing curtain is present at the running readiness position (S108). If the trailing curtain is present at the running readiness position, the process proceeds to Step S112, in which film transportation is performed. If the trailing curtain is not present at the running readiness position, driving for charging the trailing curtain is started (S109), and detection of the position of the trailing curtain is performed while performing the driving for charging the trailing curtain (S110). If it is detected that the trailing curtain has reached the running readiness position, the driving for charging the trailing curtain is brought to a stop (S111). Since the possibility that the current frame of the film has been exposed is high, film transportation is performed (S112). An error display is provided which indicates that the trailing curtain has erroneously run down (S113), and the process waits for the next release operation.

The detection of the position in which the leading curtain is present is performed (S104), and if the leading curtain is present at the running readiness position, detection of the position in which the trailing curtain is present is performed (S120). If it is detected that the trailing curtain is present at the running readiness position, the process proceeds to the next step S130. If it is detected that the trailing curtain is not preset at the running readiness position, driving for charging the trailing curtain is started (S121), and detection of the position of the trailing curtain is performed while performing the driving for charging the trailing curtain (S122). If it is detected that the trailing curtain has reached the running readiness position, the driving for charging the trailing curtain is brought to a stop (S123). Then, mirror driving and diaphragm driving are performed (S130), and the process proceeds to Step S140.

In Step S140 of FIG. 24, the ultrasonic motor 402a which is holding the leading curtain is made to generate a standing wave, so that the holding torque of the ultrasonic motor 402a which is applied to the leading curtain is lowered to start a running of the leading curtain. Further, a timer for counting a shutter time is started (S141). Detection of the position of the leading curtain is performed in Step S142, and if it is detected that the leading curtain has reached the running braking position, a resistance is generated in the ultrasonic motor 402a by varying the extent of the standing wave generated by the ultrasonic motor 402a for the leading curtain, thereby braking the leading curtain (S143). While the leading curtain is being braked, detection of the position of the leading curtain is performed (S144), and if it is detected that the leading curtain has reached the running completion position, the generation of the standing wave by the ultrasonic motor 402a for the leading curtain is brought to a stop to generate a holding torque in the ultrasonic motor 402a, thereby stopping the leading curtain (S147). At this time, not only is the leading curtain brought to a stop but also the leading curtain is secured by the holding torque of the ultrasonic motor 402a to prevent the leading curtain from bounding. Then, if it is detected in Step S148 that the timer for counting the shutter time, which has been set in Step S141, has completed its counting operation, the ultrasonic motor 402b which is holding the trailing curtain is made to generate a standing wave, so that the holding torque of the ultrasonic motor 402b which is applied to the trailing curtain is lowered to start a running of the trailing curtain (S149). If it is not detected in Step S144 that the leading curtain has reached the running completion position, it is detected whether the timer for counting the shutter time, which has been set in Step S141, has completed its counting operation (S145) If it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S146). If it is not detected in Step S145 that the timer has completed the counting operation, the process returns to Step S144, in which the above-described detection of the position of the leading curtain is performed.

Also, the detection of the position of the leading curtain is performed in Step S142 and if it is not detected that the leading curtain has reached the running braking position, detection of the position of the trailing curtain is performed (S151). If it is detected that the trailing curtain has reached the running braking position, a display indicating that an abnormality has occurred in the shutter is provided (S152). If it is not detected that the trailing curtain has reached the running braking position, it is detected whether the timer for counting the shutter time, which has been set in Step S141, has completed the counting operation (S153). If it is not detected that the timer has completed the counting operation, the process returns to Step S142 in which the above-described detection of the position of the leading curtain is performed. Also, if it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S154).

Then, detection of the position of the leading curtain is performed (S155), and if it is not detected that the leading curtain has reached the running braking position, detection of the position of the trailing curtain is performed (S157). If it is detected that the trailing curtain has reached the running braking position, a display indicating that an abnormality has occurred in the shutter is provided (S158). If it is not detected that the trailing curtain has reached the running braking position, detection of the position of the leading curtain is performed in Step S155. If it is detected that the leading curtain has reached the running braking position, a resistance is generated in the ultrasonic motor 402a by varying the extent of the standing wave generated by the ultrasonic motor 402a for the leading curtain, thereby braking the leading curtain (S156). Then, while the leading curtain is being braked, detection of the position of the trailing curtain is performed (S159). If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S160). Then, while the trailing curtain is being braked, detection of the position of the leading curtain is performed (S161). If it is not detected that the leading curtain has reached the running completion position, detection of the position of the trailing curtain is performed (S162). If it is detected that the trailing curtain has reached the running completion position, a display indicating that an abnormality has occurred in the shutter is provided (S163). If it is not detected that the trailing curtain has reached the running completion position, detection of the position of the leading curtain is performed in Step S161. If it is detected that the leading curtain has reached the running completion position, the generation of the standing wave by the ultrasonic motor 402a for the leading curtain is brought to a stop to generate a holding torque in the ultrasonic motor 402a, thereby stopping the running of the leading curtain (S164). At this time, not only is the leading curtain brought to a stop but also the leading curtain is secured by the holding torque of the ultrasonic motor 402a to prevent the leading curtain from bounding.

If it is not detected in Step S159 that the trailing curtain has reached the running braking position, detection of the position of the leading curtain is performed (S165). If it is not detected that the leading curtain has reached the running completion position, detection of the position of the trailing curtain is performed in Step S159. If it is detected in Step S165 that the leading curtain has reached the running completion position, the generation of the standing wave by the ultrasonic motor 402a for the leading curtain is brought to a stop to generate a holding torque in the ultrasonic motor 402a, thereby stopping the running of the leading curtain (S166). At this time, not only is the leading curtain brought to a stop but also the leading curtain is secured by the holding torque of the ultrasonic motor 402a to prevent the leading curtain from bounding.

Then, detection of the position of the trailing curtain is performed in Step S167. If it is not detected that the trailing curtain has reached the running braking position, the detection of the position is repeated. If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S168). While the trailing curtain is being braked, detection of the position of the trailing curtain is performed (S169), and if it is not detected that the trailing curtain has reached the running completion position, the detection of the position of the trailing curtain is repeated. If it is detected that the trailing curtain has reached the running completion position, the generation of the standing wave by the ultrasonic motor 402b for the trailing curtain is brought to a stop to generate a holding torque in the ultrasonic motor 402b, thereby stopping the trailing curtain (S170). At this time, not only is the trailing curtain brought to a stop but also the trailing curtain is secured by the holding torque of the ultrasonic motor 402b to prevent the trailing curtain from bounding.

If a selected shutter running mode is the panorama mode, the flowchart of FIG. 25 is selected. If it is determined in Step 201 that a shutter release operation has been performed, a battery check is performed (S202). If the battery capacity is insufficient, a warning indicating that the battery capacity is insufficient is displayed (S203). If the battery capacity is sufficient, detection of the position in which the leading curtain is present is performed (S204). If the leading curtain is not present at the running readiness position, the ultrasonic motor 402a is made to generate a travelling wave, thereby starting driving for charging the leading curtain (S205), and detection of the position of the leading curtain is performed while performing the driving for charging the leading curtain (S206). If it is detected that the leading curtain has reached the running readiness position, the ultrasonic motor 402a is brought to a stop, thereby stopping the driving for charging the leading curtain (S207). It is detected whether the trailing curtain is present at the panorama running readiness position (S208). If the trailing curtain is present at the panorama running readiness position, the process proceeds to Step 214, in which film transportation is performed. An error display is provided which indicates that the trailing curtain has erroneously run down (S215), and the process waits for the next release operation. If the trailing curtain is not present at the panorama running readiness position, it is detected whether the trailing curtain is present at the running readiness position (S209). If the trailing curtain is not present at the running readiness position, a travelling wave is generated to start driving for charging the trailing curtain (S211). If the trailing curtain is present at the running readiness position, the ultrasonic motor 402b is made to generate a standing wave to start driving the trailing curtain in a running direction thereof (S210). Thus, while the driving for charging the trailing curtain or the driving of the trailing curtain in the running direction is being performed, detection of the position of the trailing curtain is performed (S212). If it is determined that the trailing curtain has reached the panorama running readiness position, the ultrasonic motor 402b is made inoperative to stop the driving of the trailing curtain (S213). Since the possibility that the current frame of the film has been exposed is high, film transportation is performed (S214). An error display is provided which indicates that the trailing curtain has erroneously run down (S215), and the process waits for the next release operation. The detection of the position in which the leading curtain is present is performed (S204). If the leading curtain is present at the running readiness position, detection of the position in which the trailing curtain is present is performed (S220). If it is detected that the trailing curtain is present at the panorama running readiness position, the process proceeds to the next step 230. If it is detected that the trailing curtain is not present at the panorama running readiness position, detection of the position in which the trailing curtain is present is performed (S221). If it is detected that the trailing curtain is present at the running readiness position, driving of the trailing curtain in the running direction is started (S222). If it is detected that the trailing curtain is not present at the running readiness position, driving for charging the trailing curtain is started (S223). Thus, while the driving for charging the trailing curtain or the driving of the trailing curtain in the running direction is being performed, detection of the position of the trailing curtain is performed (S224). If it is detected that the trailing curtain has reached the panorama running readiness position, the driving of the trailing curtain is brought to a stop (S225). Then, mirror driving and diaphragm driving are performed (S230), and the process proceeds to Step 240.

In Step 240 of FIG. 26, the ultrasonic motor 402a which is holding the leading curtain is made to generate a standing wave, so that the holding torque of the ultrasonic motor 402a which is applied to the leading curtain is lowered to start a running of the leading curtain. Further, a timer for counting a shutter time is started (S241).

Detection of the position of the leading curtain is performed (S242). If it is detected that the leading curtain has reached the panorama running braking position, a resistance is generated in the ultrasonic motor 402a by varying the extent of the standing wave generated by the ultrasonic motor 402a for the leading curtain, thereby braking the leading curtain (S243). While the leading curtain is being braked, detection of the position of the leading curtain is performed (S244), and if it is detected that the leading curtain has reached the panorama running completion position, the generation of the standing wave by the ultrasonic motor 402a for the leading curtain is brought to a stop to generate a holding torque in the ultrasonic motor 402a, thereby stopping the leading curtain (S247). At this time, not only is the leading curtain brought to a stop but also the leading curtain is secured by the holding torque of the ultrasonic motor 402a to prevent the leading curtain from bounding. Then, if it is detected in Step 248 that the timer for counting the shutter time, which has been set in Step 241, has completed its counting operation, the ultrasonic motor 402b which is holding the trailing curtain is made to generate a standing wave, so that the holding torque of the ultrasonic motor 402b which is applied to the trailing curtain is lowered to start a running of the trailing curtain (S249). If it is not detected in Step 244 that the leading curtain has reached the panorama running completion position, it is detected whether the timer for counting the shutter time, which has been set in Step S241, has completed its counting operation (S245). If it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S246). If it is not detected in Step 245 that the timer has completed the counting operation, the process returns to Step 244, in which the above-described detection of the position of the leading curtain is performed. Also, the detection of the position of the leading curtain is performed in Step 242 and if it is not detected that the leading curtain has reached the panorama running braking position, detection of the position of the trailing curtain is performed (S251). If it is detected that the trailing curtain has reached the running braking position, a display indicating that an abnormality has occurred in the shutter is provided (S252). If it is not detected that the trailing curtain has reached the running braking position, it is detected whether the timer for counting the shutter time, which has been set in Step 241, has completed the counting operation (S253). If it is not detected that the timer has completed the counting operation, the process returns to Step 242 in which the above-described detection of the position of the leading curtain is performed. Also, if it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S254).

Then, detection of the position of the leading curtain is performed (S255), and if it is not detected that the leading curtain has reached the panorama running braking position, detection of the position of the trailing curtain is performed (S257). If it is detected that the trailing curtain has reached the running braking position, a display indicating that an abnormality has occurred in the shutter is provided (S258). If it is not detected that the trailing curtain has reached the running braking position, detection of the position of the leading curtain is performed in Step 255. If it is detected that the leading curtain has reached the panorama running braking position, a resistance is generated in the ultrasonic motor 402a by varying the extent of the standing wave generated by the ultrasonic motor 402a for the leading curtain, thereby braking the leading curtain (S256). Then, while the leading curtain is being braked, detection of the position of the trailing curtain is performed (S259). If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S260). Then, while the trailing curtain is being braked, detection of the position of the leading curtain is performed (S261). If it is not detected that the leading curtain has reached the running completion position, detection of the position of the trailing curtain is performed (S262). If it is detected that the trailing curtain has reached the running completion position, a display indicating that an abnormality has occurred in the shutter is provided (S263). If it is not detected that the trailing curtain has reached the running completion position, detection of the position of the leading curtain is performed in Step 261. If it is detected that the leading curtain has reached the panorama running completion position, the generation of the standing wave by the ultrasonic motor 402a for the leading curtain is brought to a stop to generate a holding torque in the ultrasonic motor 402a, thereby stopping the running of the leading curtain (S264). At this time, not only is the leading curtain brought to a stop but also the leading curtain is secured by the holding torque of the ultrasonic motor 402a to prevent the leading curtain from bounding, and the process proceeds to the next step 269. Also, if it is not detected in Step 259 that the trailing curtain has reached the running braking position, detection of the position of the leading curtain is performed (S265). If it is not detected that the leading curtain has reached the panorama running completion position, detection of the position of the trailing curtain is performed in Step 259. If it is detected that the leading curtain has reached the panorama running completion position, the generation of the standing wave by the ultrasonic motor 402a for the leading curtain is brought to a stop to generate a holding torque in the ultrasonic motor 402a, thereby stopping the running of the leading curtain (S266). At this time, not only is the leading curtain brought to a stop but also the leading curtain is secured by the holding torque of the ultrasonic motor 402a to prevent the leading curtain from bounding.

Then, detection of the position of the trailing curtain is performed in Step 267. If it is not detected that the trailing curtain has reached the running braking position, the detection of the position is repeated. If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S268). While the trailing curtain is being braked, detection of the position of the trailing curtain is performed (S269), and if it is not detected that the trailing curtain has reached the running completion position, the detection of the position of the trailing curtain is repeated. If it is detected that the trailing curtain has reached the running completion position, the generation of the standing wave by the ultrasonic motor 402b for the trailing curtain is brought to a stop to generate a holding torque in the ultrasonic motor 402b, thereby stopping the trailing curtain (S270). At this time, not only is the trailing curtain brought to a stop but also the trailing curtain is secured by the holding torque of the ultrasonic motor 402b to prevent the trailing curtain from bounding.

If a selected shutter running mode is the mask mode, the flowchart of FIG. 27 is selected. If it is determined in Step 301 that a shutter release operation has been performed, a battery check is performed (S302). If the battery capacity is insufficient, a warning indicating that the battery capacity is insufficient is displayed (S303). If he battery capacity is sufficient, detection of the position in which the leading curtain is present is performed (S304). If the leading curtain is not present at the running readiness position, driving for charging the leading curtain is started (S305), and detection of the position of the leading curtain is performed while performing the driving for charging the leading curtain (S306). If it is detected that the leading curtain has reached the running readiness position, the driving for charging the leading curtain is brought to a stop (S307). It is detected whether the trailing curtain is present at the panorama running readiness position (S308). If the trailing curtain is present at the panorama running readiness position, film transportation is performed (S314). An error display is provided which indicates that the trailing curtain has erroneously run down (S315), and the process waits for the next release operation. If it is determined in Step 308 that the trailing curtain is not present at the panorama running readiness position, it is detected whether the trailing curtain is present at the running readiness position (S309). If the trailing curtain is not present at the running readiness position, driving for charging the trailing curtain is started (S311). If the trailing curtain is present at the running readiness position, driving of the trailing curtain in the running direction is started (S310). Thus, while the driving for charging the trailing curtain or the driving of the trailing curtain in the running direction is being performed, detection of the position of the trailing curtain is performed (S312). If it is determined that the trailing curtain has reached the panorama running readiness position, the driving of the trailing curtain is brought to a stop (S313). Since the possibility that the current frame of the film has been exposed is high, film transportation is performed (S314). An error display is provided which indicates that the trailing curtain has erroneously run down (S315), and the process waits for the next release operation.

The detection of the position in which the leading curtain is present is performed (S304). If the leading curtain is present at the running readiness position, detection of the position n which the trailing curtain is present is performed (S320). If it is detected that the trailing curtain is present at the panorama running readiness position, the process proceeds to the next step 330. If it is detected that the trailing curtain is not present at the panorama running readiness position, detection of the position in which the trailing curtain is present is performed (S321). If it is detected that the trailing curtain is present at the running readiness position, driving of the trailing curtain in the running direction is started (S322). If it is detected that the trailing curtain is not present at the running readiness position, driving for charging the trailing curtain is started (S323). Thus, while the driving for charging the trailing curtain or the driving of the trailing curtain in the running direction is being performed, detection of the position of the trailing curtain is performed (S324). If it is detected that the trailing curtain has reached the panorama running readiness position, the driving of the trailing curtain is brought to a stop (S325). Then, mirror driving and diaphragm driving are performed (S330), and the process proceeds to Step S140.

In Step S140 of FIG. 24, the ultrasonic motor 402a which is holding the leading curtain is made to generate a standing wave, so that the holding torque of the ultrasonic motor 402a which is applied to the leading curtain is lowered to start a running of the leading curtain. Further, the timer for counting the shutter time is started (S141).

Detection of the position of the leading curtain is performed in Step S142, and if it is detected that the leading curtain has reached the running braking position, a resistance is generated in the ultrasonic motor 402a by varying the extent of the standing wave generated by the ultrasonic motor 402a for the leading curtain, thereby braking the leading curtain (S143). While the leading curtain is being braked, detection of the position of the leading curtain is performed (S144), and if it is detected that the leading curtain has reached the running completion position, the generation of the standing wave by the ultrasonic motor 402a for the leading curtain is brought to a stop to generate a holding torque in the ultrasonic motor 402a, thereby stopping the leading curtain (S147). At this time, not only is the leading curtain brought to a stop but also the leading curtain is secured by the holding torque of the ultrasonic motor 402a to prevent the leading curtain from bounding. Then, if it is detected in Step S148 that the timer for counting the shutter time, which has been set in Step S141, has completed its counting operation, the ultrasonic motor 402b which is holding the trailing curtain is made to generate a standing wave, so that the holding torque of the ultrasonic motor 402b which is applied to the trailing curtain is lowered to start a running of the trailing curtain (S149). If it is not detected in Step S144 that the leading curtain has reached the running completion position, it is detected whether the timer for counting the shutter time, which has been set in Step S141, has completed its counting operation (S145). If it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S146). If it is not detected in Step S145 that the timer has completed the counting operation, the process returns to Step S144, in which the above-described detection of the position of the leading curtain is performed. Also, the detection of the position of the leading curtain is performed in Step S142 and if it is not detected that the leading curtain has reached the running braking position, detection of the position of the trailing curtain is performed (S151). If it is detected that the trailing curtain has reached the running braking position, a display indicating that an abnormality has occurred in the shutter is provided (S152). If it is not detected that the trailing curtain has reached the running braking position, it is detected whether the timer for counting the shutter time, which has been set in Step S141, has completed the counting operation (S153). If it is not detected that the timer has completed the counting operation, the process returns to Step S142 in which the above-described detection of the position of the leading curtain is performed. Also, if it is detected that the timer has completed the counting operation, the ultrasonic motor 402b which is holding the trailing curtain is made to generate a standing wave, so that the holding torque of the ultrasonic motor 402b which is applied to the trailing curtain is lowered to start a running of the trailing curtain (S154).

Then, detection of the position of the leading curtain is performed (S155), and if it is not detected that the leading curtain has reached the running braking position, detection of the position of the trailing curtain is performed (S157). If it is detected that the trailing curtain has reached the running braking position, a display indicating that an abnormality has occurred in the shutter is provided (S158). If it is not detected that the trailing curtain has reached the running braking position, detection of the position of the leading curtain is performed in Step S155. If it is detected that the leading curtain has reached the running braking position, a resistance is generated in the ultrasonic motor 402a by varying the extent of the standing wave generated by the ultrasonic motor 402a for the leading curtain, thereby braking the leading curtain (S156). Then, while the leading curtain is being braked, detection of the position of the trailing curtain is performed (S159). If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S160). Then, while the trailing curtain is being braked, detection of the position of the leading curtain is performed (S161). If it is not detected that the leading curtain has reached the running completion position, detection of the position of the trailing curtain is performed (S162). If it is detected that the trailing curtain has reached the running completion position, a display indicating that an abnormality has occurred in the shutter is provided (S163). If it is not detected that the trailing curtain has reached the running completion position, detection of the position of the leading curtain is performed in Step S161. If it is detected that the leading curtain has reached the running completion position, the generation of the standing wave by the ultrasonic motor 402a for the leading curtain is brought to a stop to generate a holding torque in the ultrasonic motor 402a, thereby stopping the running of the leading curtain (S164). At this time, not only is the leading curtain brought to a stop but also the leading curtain is secured by the holding torque of the ultrasonic motor 402a to prevent the leading curtain from bounding. Then, the process proceeds to the next step.

Also, if it is not detected in Step S159 that the trailing curtain has reached the running braking position, detection of the position of the leading curtain is performed (S165). If it is not detected that the leading curtain has reached the running completion position, detection of the position of the trailing curtain is performed in Step S159. If it is detected in Step S165 that the leading curtain has reached the running completion position, the generation of the standing wave by the ultrasonic motor 402a for the leading curtain is brought to a stop to generate a holding torque in the ultrasonic motor 402a, thereby stopping the running of the leading curtain (S166). At this time, not only is the leading curtain brought to a stop but also the leading curtain is secured by the holding torque of the ultrasonic motor 402a to prevent the leading curtain from bounding.

Then, detection of the position of the trailing curtain is performed in Step S167. If it is not detected that the trailing curtain has reached the running braking position, the detection of the position is repeated. If it is detected that the trailing curtain has reached the running braking position, a resistance is generated in the ultrasonic motor 402b by varying the extent of the standing wave generated by the ultrasonic motor 402b for the trailing curtain, thereby braking the trailing curtain (S168). While the trailing curtain is being braked, detection of the position of the trailing curtain is performed (S169), and if it is not detected that the trailing curtain has reached the running completion position, the detection of the position of the trailing curtain is performed in Step S169. If it is detected that the trailing curtain has reached the running completion position, the generation of the standing wave by the ultrasonic motor 402b for the trailing curtain is brought to a stop to generate a holding torque in the ultrasonic motor 402b, thereby stopping the trailing curtain (S170). At this time, not only is the trailing curtain brought to a stop but also the trailing curtain is secured by the holding torque of the ultrasonic motor 402b to prevent the trailing curtain from bounding.

The third embodiment is applicable to not only the above-described shutter running modes, i.e., the standard mode, the panorama mode and the mask mode, but also a gradation exposure mode. During the gradation exposure mode, the respective standing waves generated by the ultrasonic motors which hold the associated shutter blade groups are varied according to the extent of a selected gradation during a shutter running to vary the curtain speeds of the respective leading and trailing curtains, thereby effecting gradation exposure.

In the description of the third embodiment, reference has been made to the case where the shutter blade groups are made to run by driving using the associated springs with standing waves generated. However, the above-described control is useful for application to a driving apparatus using travelling waves.

<Fourth Embodiment>

A fourth embodiment utilizes the controlling signal patterns 404a and 404b which are provided in the control circuit example which has been described in connection with the third embodiment of the present invention with reference to the block diagram of FIG. 19. According to the fourth embodiment, position detection is performed on the basis of running braking signals obtainable from the controlling signal patterns 404a and 404b which are provided for outputting position signals relative to the running of the respective leading and trailing curtains. Further, since a portion of each of the signal patterns 404a and 404b is employed as an X-sync contact, it is not necessary to provide the camera with an independent X-sync contact.

Figure 28:
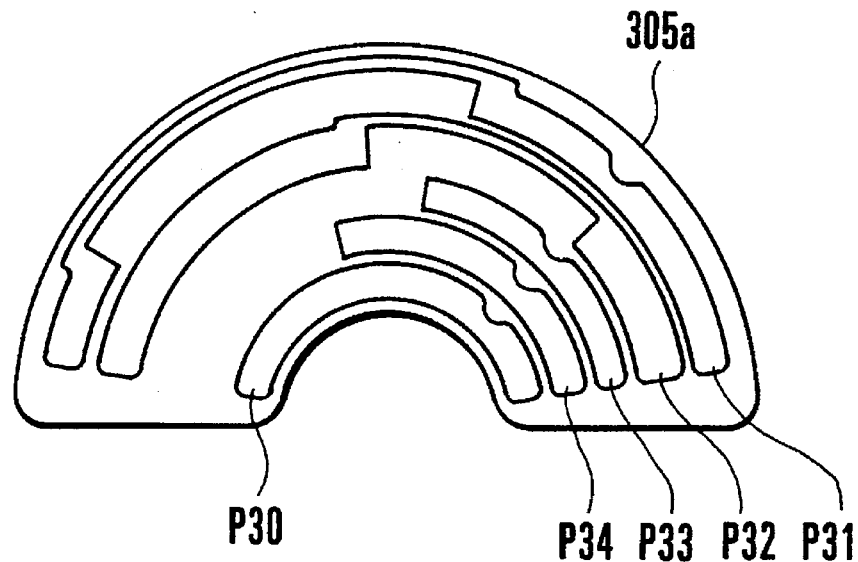
FIG. 28 is a diagrammatic plan view of a signal pattern plate which is provided in a shutter system according to a fourth embodiment of the present invention.
Figure 29:
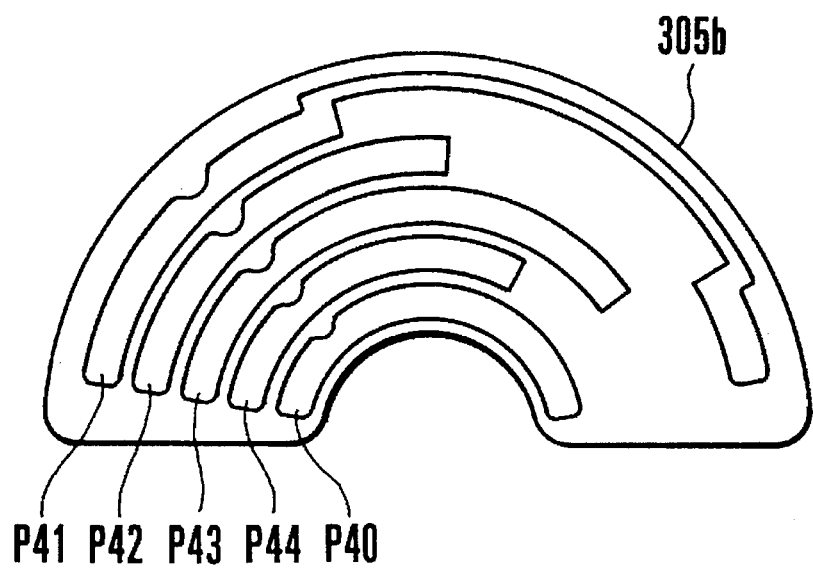
FIG. 29 is a diagrammatic plan view of another signal pattern plate which is provided in the shutter system according to the fourth embodiment of the present invention.

FIGS. 28 and 29 show examples of signal pattern plates on which shutter controlling signal patterns are respectively formed.

FIG. 28 shows a signal pattern plate 305a for the leading curtain, and five conductor patterns P30, P31, P32, P33 and P34 are formed on the signal pattern plate 305a. The conductor pattern P30 is connected to ground. The conductor pattern P31 indicates the running completion position and the running readiness position of the leading curtain. The conductor pattern P32 indicates the panorama running completion position of the leading curtain. The conductor pattern P33 indicates the running braking position of the leading curtain. The conductor pattern P34 indicates the panorama running braking position of the leading curtain.

FIG. 29 shows a signal pattern plate 305b for the trailing curtain, and five conductor patterns P40, P41, P42, P43 and P44 are formed on the signal pattern plate 305b. The conductor pattern P40 is connected to ground. The conductor pattern P41 indicates the running completion position and the running readiness position of the trailing curtain. The conductor pattern P42 indicates the panorama running readiness position of the trailing curtain. The conductor pattern P43 indicates the running braking position of the trailing curtain. The conductor pattern P44 indicates the panorama running braking position of the trailing curtain.

The slide contact 306a of FIG. 17 comes into sliding contact with the conductor pattern P33 to generate a leading curtain's running braking position detection signal, and also the slide contact 306a comes into sliding contact with the conductor pattern P34 to generate a trailing curtain's panorama running braking position detection signal. The conductor pattern P34 can also be used as an X-sync contact for a flash unit. The slide contact 306b comes into sliding contact with the conductor pattern P43 to generate a trailing curtain's running braking position detection signal, and also the slide contact 306b comes into sliding contact with the conductor pattern P44 to generate a trailing curtain's panorama running braking position detection signal. Since the conductor pattern P44 can also be used as an X-sync contact for a flash unit, it is possible to cope with a high-voltage flash unit and the difference in polarity between X-sync signals.

In the above description of the embodiments, reference has been made to the shutter system of the type in which the shutter blade groups are made to run by the forces of the respective springs and the braking forces applied to the respective shutter blade groups are varied by the associated ultrasonic motors. However, the present invention is of course applicable to a shutter system of the type in which the shutter blade groups are driven by the respective ultrasonic motors.

What is claimed is:

1. A driving apparatus for driving a driven member, comprising:

an urging member for applying an urging force to the driven member in a first direction;

a vibration type motor having a vibrating member, a moving member arranged to contact the vibrating member, said moving member being coupled to the driven member and arranged to restrain travel of the driven member against the urging force of the urging member with a friction force between the vibrating member and the moving member when the motor is not operative, and said motor being arranged, in the standing wave mode, to form a standing wave in the vibrating member and lower the friction force between the vibrating member and the moving member with the standing wave to move the driven member with the urging force in the first direction, and a controlling circuit for supplying a signal for causing the motor to drive in the standing wave mode.

2. A driving apparatus according to claim 1, wherein said controlling circuit adjusts an amplitude produced when said vibration type motor is in the standing wave mode, a resistance against the urging force being adjusted by adjusting the amplitude.

3. A driving apparatus for driving a driven member, comprising:

an urging member for applying an urging force to the driven member in a first direction;

a vibration type motor having a vibrating member, a moving member arranged to contact the vibrating member, said member being coupled to the driven member and arranged to restrain travel of the driven member against the urging force of the urging member with a friction force between the vibrating member and the moving member when the motor is not operative, and said motor being arranged, in the standing wave mode, to form a standing wave in the vibrating member and lower the friction force between the vibrating member and the moving member with the standing wave to move the driven member with the urging force in the first direction and said motor having a travelling wave mode for generating a driven force to drive the driven member in a predetermined direction; and a controlling circuit for supplying a signal for causing the motor to drive in the standing wave mode and a signal for causing the motor to drive in the travelling wave mode so as to move the driven member in a direction contrary to the first direction.

4. A driving apparatus according to claim 3, further comprising a controlling circuit for performing control to start and stop the travel of the driven member, by shifting said vibration type motor from the inoperative state to the standing wave mode when said urging member is in its charged state, and thereafter shifting said vibration type motor to the inoperative state.

5. A driving apparatus according to claim 3, wherein the controlling circuit causes the motor to drive in the travelling wave mode when the urging member is in a non-charged state so as to shift the urging member to a charged state.

6. A shutter system for a camera, comprising:

a shutter blade;

an urging member for applying to said shutter blade an urging force for causing the shutter blade to run in a first direction;

a vibration type motor having a vibrating member;

a moving member arranged to contact the vibrating member, said moving member being arranged to restrain travel of the shutter blade against the urging force of the urging member with a friction force between the vibrating member and the moving member when the motor is not operative, and said motor being arranged, in the standing wave mode, to form a standing wave in the vibrating member and lower the friction force between the vibrating member and the moving member with the standing wave to move the shutter blade with the urging force in the first direction; and a controlling circuit for supplying a signal for causing the motor to drive in the standing wave mode.

7. A shutter system according to claim 6, wherein said vibration type motor adjusts a state of vibration generated when in the standing wave mode to adjust a resistance against the urging force.

8. A shutter system according to claim 6, wherein said vibration type motor has a travelling wave mode as another operating mode, said vibration type motor, when in the travelling wave move, causing said shutter blade to travel in a direction against the urging force.

9. A shutter system according to claim 6, said controlling circuit shifting said vibration type motor from the inoperative state to the standing wave mode and then shifting said vibration type motor to the inoperative state after lowering the state of vibration generated when in the standing wave mode.

10. A shutter system according to claim 9, wherein said controlling circuit monitors a state of travel of said shutter blade, and lowers, when said shutter blade travels to a position a predetermined amount before a stop position of said shutter blade, the state of vibration generated when in the standing wave mode and brings said vibration type motor into the inoperative state when said shutter blade travels to the stop position.

11. A driving apparatus for driving a driven member, comprising:

an urging member for applying an urging force to the driven member in a first direction;

a vibration type motor having a vibrating member;

a moving member arranged to contact the vibrating member, said moving member being coupled to the driven member and arranged to restrain travel of the driven member against the urging force of the urging member with a friction force between the vibrating member and the moving member when the motor is not operative, and said motor being arranged, in the standing wave mode, to form a standing wave in the vibrating member and lower the friction force between the vibrating member and the moving member with the standing wave to move the driven member with the urging force in the first direction; and a controlling circuit for supplying a cycle signal for causing the motor to drive in the standing wave mode, said circuit being arranged, in the standing wave mode, to change a frequency of the cycle signal at a drive start time of the motor in the standing wave mode to a different frequency while the driven member moves to a drive stop position.

12. An apparatus according to claim 11, wherein the frequency for being changed is higher than that of the cycle signal at the drive start time.

13. An apparatus according to claim 12, wherein a frequency in a neighborhood of the drive stop position is changed to the higher frequency.

14. A shutter system for a camera, comprising:

a shutter blade;

an urging member for applying to the shutter blade an urging force for causing said shutter blade to run in a first direction;

a vibration type motor having a vibrating member;

a moving member arranged to contact the vibrating member, said moving member being arranged to restrain travel of the shutter blade against the urging force of the urging member with a friction force between the vibrating member and the moving member when the motor is not operative, said motor, being arranged, in the standing wave mode, to form a standing wave in the vibrating member and lower the friction force between the vibrating member and the moving member with the standing wave to move the shutter blade with the urging force in the first direction; and a controlling circuit for supporting a cycle signal for causing the motor to drive in the standing wave mode, the circuit being arranged, in the standing wave mode, to change a frequency of the cycle signal at a drive start time of the motor in the standing wave mode to a different frequency while the shutter blade moves to a drive stop position.

15. A system according to claim 14, wherein the frequency for being changed is higher than that of the cycle signal at the drive start time.

16. A system according to claim 15, wherein a frequency in a neighborhood of the drive stop position is changed to the higher frequency.

* * * * *

UNITED STATES PATENT AND TRADEMARK OFFICE
CERTIFICATE OF CORRECTION

PATENT NO. : 5,659,821
DATED : August 19, 1997
INVENTOR(S): Kawakita et al.

It is certified that error appears in the above-identified patent and that said Letters Patent are hereby corrected as shown below:

| | | | | |
|---|---|---|---|---|
| Col. 2, line 16, | delete | "therefore,an" | and insert | -- therefore, an --. |
| Col. 8, line 64, | delete | "fraction" | and insert | -- friction --. |
| Col. 14, line 2, | delete | "110" | and insert | -- 11c --. |
| Col. 22, line 47, | delete | "201" | and insert | -- S201 --. |
| Col. 22, line 65, | delete | "214" | and insert | -- S214 --. |
| Col. 23, line 29, | delete | "230" | and insert | -- S230 --. |
| Col. 23, line 45, | delete | "240" | and insert | -- S240 --. |
| Col. 23, line 46, | delete | "240" | and insert | -- S240 --. |
| Col. 24, line 2, | delete | "248" | and insert | -- S248 --. |
| Col. 24, line 3, | delete | "241" | and insert | -- S241 --. |
| Col. 24, line 9, | delete | "244" | and insert | -- S244 --. |
| Col. 24, line 19, | delete | "245" | and insert | -- S245 --. |
| Col. 24, line 20, | delete | "244" | and insert | -- S244 --. |
| Col. 24, line 23, | delete | "242" | and insert | -- S242 --. |

UNITED STATES PATENT AND TRADEMARK OFFICE
CERTIFICATE OF CORRECTION

PATENT NO. : 5,659,821

DATED : August 19, 1997

INVENTOR(S) : Kawakita et al.

It is certified that error appears in the above-identified patent and that said Letters Patent are hereby corrected as shown below:

| | | | | | |
|---|---|---|---|---|---|
| Col. 24, | line 32, | delete | "241" | and insert | -- S241 --. |
| Col. 24, | line 35, | delete | "242" | and insert | -- S242 --. |
| Col. 24, | line 52, | delete | "255" | and insert | -- S255 --. |
| Col. 25, | line 7, | delete | "261" | and insert | -- S261 --. |
| Col. 25, | line 17, | delete | "269" | and insert | -- S269 --. |
| Col. 25, | line 18, | delete | "259" | and insert | -- S259 --. |
| Col. 25, | line 23 | delete | "259" | and insert | -- S259 --. |
| Col. 25, | line 34, | delete | "267" | and insert | -- S267 --. |
| Col. 25, | line 57, | delete | "301" | and insert | -- S301 --. |
| Col. 26, | line 9, | delete | "308" | and insert | -- S308 --. |
| Col. 26, | line 32, | delete | "position n" | and insert | -- position in --. |

UNITED STATES PATENT AND TRADEMARK OFFICE
CERTIFICATE OF CORRECTION

PATENT NO. : 5,659,821
DATED : August 19, 1997
INVENTOR(S) : Kawakita, et. al.

It is certified that error appears in the above-identified patent and that said Letters Patent is hereby corrected as shown below:

Col. 26, line 35, delete "330" and insert -- S330 --.

Signed and Sealed this

Tenth Day of March, 1998

Attest:

BRUCE LEHMAN

Attesting Officer     Commissioner of Patents and Trademarks